United States Patent
Chang et al.

(10) Patent No.: US 12,482,889 B2
(45) Date of Patent: Nov. 25, 2025

(54) BATTERY PACK, BATTERY MODULE HAVING THE BATTERY PACK, POWER SUPPLY DEVICE HAVING THE BATTERY MODULE

(71) Applicant: Samsung SDI Co., Ltd., Yongin-si (KR)

(72) Inventors: Seokgyun Chang, Yongin-si (KR); Hanho Lee, Yongin-si (KR); Dongku Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/306,804

(22) Filed: May 3, 2021

(65) Prior Publication Data
US 2021/0391619 A1      Dec. 16, 2021

(30) Foreign Application Priority Data

Jun. 15, 2020   (KR) .................. 10-2020-0072607

(51) Int. Cl.
*H01M 50/213*      (2021.01)
*H01M 4/02*      (2006.01)
(Continued)

(52) U.S. Cl.
CPC ..... *H01M 50/213* (2021.01); *H01M 10/0431* (2013.01); *H01M 10/4207* (2013.01);
(Continued)

(58) Field of Classification Search
CPC ............. H01M 50/213; H01M 50/503; H01M 50/249; H01M 50/267; H01M 50/512;
(Continued)

(56) References Cited

U.S. PATENT DOCUMENTS

| | | | |
|---|---|---|---|
| 4,607,207 A | * | 8/1986 | Bruneau ................. H01M 6/44 429/100 |
| 7,914,917 B2 | | 3/2011 | Nakashima et al. |

(Continued)

FOREIGN PATENT DOCUMENTS

| | | | | |
|---|---|---|---|---|
| JP | 2001210295 | A | * | 8/2001 |
| JP | 2007141768 | A | * | 6/2007 |

(Continued)

OTHER PUBLICATIONS

NPL—"Li-ion vs NiCad." Diffen.com. Diffen LLC, n.d. Web. Aug. 24, 2022. < https://www.diffen.com/difference/Li-ion_vs_NiCad > (Year: 2022).*

(Continued)

*Primary Examiner* — Adam J Francis
(74) *Attorney, Agent, or Firm* — Womble Bond Dickinson (US) LLP

(57) ABSTRACT

A battery pack, a battery module including the battery pack, and a power supply device including the battery module. The battery pack includes: a type-1 battery cell; and a series of type-2 battery cells which have an output power and a capacity different from an output power and a capacity of the type-1 battery cell and are arranged along a circumference of the type-1 battery cell to surround the type-1 battery cell. The series of type-2 battery cells are connected in parallel to the type-1 battery cell. The battery pack is a high-power, high-capacity battery pack capable of instantaneously outputting high power without a decrease in lifespan for a long time.

33 Claims, 18 Drawing Sheets

(51) Int. Cl.
*H01M 10/04* (2006.01)
*H01M 10/42* (2006.01)
*H01M 10/643* (2014.01)
*H01M 50/503* (2021.01)

(52) U.S. Cl.
CPC .... *H01M 50/503* (2021.01); *H01M 2004/021* (2013.01); *H01M 10/0422* (2013.01); *H01M 10/643* (2015.04)

(58) Field of Classification Search
CPC ........... H01M 50/502; H01M 10/0431; H01M 10/04; H01M 10/4207; H01M 10/42; H01M 10/0422; H01M 10/643; H01M 10/617; H01M 10/625; H01M 10/651; H01M 2004/021
See application file for complete search history.

(56) References Cited

U.S. PATENT DOCUMENTS

| | | | |
|---|---|---|---|
| 9,018,909 B2 | 4/2015 | Kimura | |
| 9,608,248 B2 | 3/2017 | Hotta et al. | |
| 9,663,188 B2 | 5/2017 | Kwag et al. | |
| 9,882,181 B2 | 1/2018 | Tsuji et al. | |
| 10,361,573 B2 | 7/2019 | Do et al. | |
| 2003/0134189 A1* | 7/2003 | Kanai | H01M 10/6563 429/120 |
| 2006/0113965 A1* | 6/2006 | Jeon | H01M 10/6563 320/150 |
| 2011/0217587 A1* | 9/2011 | An | H01M 50/209 429/156 |
| 2012/0015223 A1* | 1/2012 | Bhardwaj | H01M 10/052 429/94 |
| 2012/0183838 A1 | 7/2012 | An et al. | |
| 2012/0276419 A1* | 11/2012 | Park | H01M 50/211 429/7 |
| 2013/0157142 A1* | 6/2013 | Chen | H01M 4/0404 429/233 |
| 2015/0037638 A1 | 2/2015 | Kim et al. | |
| 2016/0322615 A1* | 11/2016 | Jeong | H01M 50/509 |
| 2016/0329542 A1* | 11/2016 | Tyler | H01M 50/505 |
| 2017/0346089 A1* | 11/2017 | Yamamoto | H01M 16/00 |
| 2018/0337560 A1* | 11/2018 | Beckman | H02J 7/04 |
| 2018/0351151 A1 | 12/2018 | Marchal et al. | |
| 2020/0194742 A1* | 6/2020 | Buckholz | H01M 50/152 |
| 2020/0227696 A1* | 7/2020 | Matsumoto | H01M 50/213 |
| 2020/0251695 A1* | 8/2020 | Keum | H01M 50/213 |
| 2023/0318105 A1* | 10/2023 | Boulanger | H01M 50/247 429/156 |

FOREIGN PATENT DOCUMENTS

| | | | |
|---|---|---|---|
| JP | 2012-099307 A | | 5/2012 |
| JP | 2014-112463 A | | 6/2014 |
| JP | 5532089 B2 | | 6/2014 |
| JP | 6209164 B2 | | 10/2017 |
| JP | 2018-018775 A | | 2/2018 |
| JP | 7081025 B2 | | 6/2022 |
| KR | 2003-0027396 A | | 4/2003 |
| KR | 10-2007-0076484 A | | 7/2007 |
| KR | 10-0868609 B1 | | 11/2008 |
| KR | 10-2010-0079725 A | | 7/2010 |
| KR | 10-2012-0033573 A | | 4/2012 |
| KR | 10-2012-0082227 A | | 7/2012 |
| KR | 10-2013-0038795 A | | 4/2013 |
| KR | 20140132132 A | * | 11/2014 |
| KR | 10-2015-0015251 A | | 2/2015 |
| KR | 10-2016-0071196 A | | 6/2016 |
| KR | 10-1934399 B1 | | 1/2019 |
| KR | 10-2015291 B1 | | 10/2019 |
| WO | 2010/013839 A1 | | 2/2010 |
| WO | 2012-147137 A1 | | 11/2012 |
| WO | 2016-103658 A1 | | 6/2016 |

OTHER PUBLICATIONS

NPL—NiCd nickel Cadmium Battery technology overview; 2022 https://www.electronics-notes.com/articles/electronic_components/battery-technology/nicad-nicd-nickel-cadmium-technology.php#:~:text=NiCd%20cells%20have%20a%20very,ohms%20when%20almost%20completely%20discharged (Year: 2022).*

English Translation of JP2007141768A; Battery pack Jun. 7, 2007 (Year: 2007).*

English Translation of JP2001210295A—Packed Batteries; Sanyo Electric Co; Aug. 3, 2001 (Year: 2001).*

English Trnalstion of KR20140132132A—Battery pack comprising cylinder type secondary battery cells having different diameters; LG Chemical Ltd; Nov. 17, 2014 (Year: 2014).*

Extended European Search Report for Application No. 21179594.3, mailed Nov. 25, 2021, 10 pages.

Korean Notice of Allowance for Application No. 10-2020-0072607, issued Apr. 21, 2023, 3 pages.

Chinese Office action for Application No. 202110660640.5, issued Jan. 4, 2024, 23 pages.

* cited by examiner

BATTERY PACK, BATTERY MODULE HAVING THE BATTERY PACK, POWER SUPPLY DEVICE HAVING THE BATTERY MODULE

CROSS-REFERENCE TO RELATED APPLICATION

This application claims priority to and the benefit of Korean Patent Application No. 10-2020-0072607, filed on Jun. 15, 2020, in the Korean Intellectual Property Office, the disclosure of which is incorporated herein in its entirety by reference.

BACKGROUND

1. Field

One or more embodiments relate to a battery pack, a battery module including the battery pack, and a power supply device including the battery module.

2. Description of Related Art

In general, secondary batteries refer to batteries that can be repeatedly charged and recharged, unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or multi-cell secondary batteries (battery packs), each including a series of cells connected to each other as a unit, are used according to the types of devices that employ secondary batteries.

Small mobile devices such as cellular phones may be operated for a predetermined amount of time using single-cell secondary batteries. However, battery packs having high-output, high-capacity features may be suitable for devices having long operating times and consuming large amounts of power such as electric vehicles and hybrid electric vehicles. The output voltages or currents of battery packs may be increased by adjusting the number of battery cells included in the battery packs.

SUMMARY

One or more embodiments include a high-power, high-capacity battery pack capable of instantaneously outputting high power for a long time without a decrease in lifespan.

One or more embodiments include a high-power, high-capacity battery pack which is relatively inexpensive due to a hybrid structure in which a type-1 battery cell (which has a high output power) and type-2 battery cells C2 (which have a high capacity), which are manufactured with different costs to have different output power characteristics, are used together.

One or more embodiments include a battery pack in which battery cells having different heat generation characteristics are arranged adjacent to each other to facilitate heat diffusion from a type-1 battery cell generating a relatively large amount heat toward type-2 battery cells generating a relatively small amount of heat.

Additional aspects will be set forth in part in the description which follows and, in part, will be apparent from the description, or may be learned by practice of the presented embodiments of the disclosure.

According to one or more embodiments, a battery pack includes a type-1 battery cell; and a series of type-2 battery cells arranged along a circumference of the type-1 battery cell to surround the type-1 battery cell. The series of type-2 battery cells are connected in parallel to the type-1 battery cell, and each of the series of type-2 battery cells have an output power and a capacity different from an output power and a capacity of the type-1 battery cell.

For example, the output power of the type-1 battery cell may be greater than the output power of each of the series of type-2 battery cells, and the capacity of the type-1 battery cell may be less than the capacity of each of the series of type-2 battery cells.

For example, an output power density of the type-1 battery cell may be greater than output power density of each of the series of type-2 battery cells, and an energy density of the type-1 battery cell may be less than an energy density of each of the series of type-2 battery cells.

For example, an internal resistance of the type-1 battery cell may be less than an internal resistance of each of the series of type-2 battery cells.

For example, the type-1 battery cell and each of the series of type-2 battery cells may exhibit different voltage drops under a first discharge condition.

For example, the type-1 battery cell and each of the series of type-2 battery cells may have different capacities under a second discharge condition.

For example, the type-1 battery cell and each of the series of type-2 battery cells may exhibit different voltage drops under a first discharge condition, the type-1 battery cell and each of the series of type-2 battery cells may have different capacities under a second discharge condition, and the first discharge condition and the second discharge condition may respectively correspond to a relatively high rate discharge condition and a relatively low rate discharge condition.

For example, the type-1 battery cell may include a first electrode assembly which may include first and second electrode plates facing each other and a first separator arranged between the first and second electrode plates, and each of the series of type-2 battery cells may include a second electrode assembly which may include third and fourth electrode plates facing each other and a second separator arranged between the third and fourth electrode plates.

For example, the first electrode plate may include a first positive electrode active material layer on a first positive electrode base material, the second electrode plate may include a first negative electrode active material layer on a first negative electrode base material, the third electrode plate may include a second positive electrode active material layer on a second positive electrode base material, and the fourth electrode plate may include a second negative electrode active material layer on a second negative electrode base material.

For example, a thickness of the first positive electrode active material layer may be less than a thickness of the second positive electrode active material layer, and a thickness of the first negative electrode active material layer may be less than a thickness of the second negative electrode active material layer.

For example, a length of the first positive electrode active material layer may be greater than a length of the second positive electrode active material layer, and a length of the first negative active material layer may be greater than a length of the second negative active material layer.

For example, the length of the first positive electrode active material layer and the length of the first negative electrode active material layer may correspond to lengths in a winding direction of the first electrode assembly, and the length of the second positive electrode active material layer and the length of the second negative electrode active material layer may correspond to lengths in a winding direction of the second electrode assembly.

For example, a number of the series of type-2 battery cells arranged along the circumference of the type-1 battery cells may be within a range of 6 to 9.

For example, the number of the series of type-2 battery cells arranged along the circumference of the type-1 battery cells may be within a range of 7 to 9.

For example, the number of the series of type-2 battery cells arranged along the circumference of the type-1 battery cells may be within a range of 7 to 8.

For example, the series of type-2 battery cells adjacent to each other along the circumference of the type-1 battery cell may be separate from each other.

For example, gaps may be formed between mutually-facing outer circumferential surfaces of the series of type-2 battery cells adjacent to each other along the circumference of the type-1 battery cell.

For example, other gaps may be formed between the type-1 battery cell and the series of type-2 battery cells surrounding the type-1 battery cell.

For example, a clearance space may be formed between the series of type-2 battery cells which are adjacent to each other along an outer circumferential surface of the type-1 battery cell, and the clearance space may include three portions concavely converging toward gaps between the type-1 battery cell and two type-2 battery cells which are adjacent to each other, and the clearance space may extend in a columnar shape in a lengthwise direction of the type-1 battery cell.

For example, the type-1 battery cell may be a battery cell having a circular cross-section with a first diameter, and each of the series of type-2 battery cells may be a battery cell having a circular cross-section with a second diameter.

For example, the first diameter may be equal to or greater than the second diameter.

For example, the battery pack may further include at least one connection wire which electrically connects the type-1 battery cell and the series of type-2 battery cells to each other.

For example, the at least one connection wire may include a series of connection wires, and a number of the connection wires may be equal to a number of the series of type-2 battery cells arranged along the circumference of the type-1 battery cell.

For example, the connection wires may respectively form electrical connections between the type-1 battery cell and the series of type-2 battery cells.

For example, the connection wires may form a common contact on an electrode of the type-1 battery cell and may be respectively connected to electrodes of the series of type-2 battery cells while extending radially outward from the electrode of the type-1 battery cell.

For example, the battery pack may further include an input/output wire which is connected to the type-1 battery cell and forms a charge-discharge path toward an external load.

For example, the input/output wire may form a common charge-discharge path between the type-1 battery cell and the external load and between the series of type-2 battery cells and the external load.

For example, a charge-discharge path of the type-1 battery cell may include the input/output wire, and a charge-discharge path of the series of type-2 battery cells may include the input/output wire and the at least one connection wire in addition to the input/output wire.

For example, the charge-discharge path of the series of type-2 battery cells may be longer than the charge-discharge path of the type-1 battery cell.

For example, a resistance of the at least one connection wire may be greater than resistance of the input/output wire.

For example, a cross-sectional area of the input/output wire may be greater than a cross-sectional area of the at least one connection wire.

For example, the input/output wire and the at least one connection wire may respectively include first and second metal materials which are different from each other, and electrical conductivity of the first metal material may be greater than electrode conductivity of the second metal material.

For example, the at least one connection wire may include an additional resistor.

For example, the type-1 battery cell and the series of type-2 battery cells may be enclosed by a circular envelope which is continuously in contact with outer circumferential surfaces of the series of type-2 battery cells arranged along the circumference of the type-1 battery cell and continuously surrounds the series of type-2 battery cells.

For example, the battery pack may further include a pack case which provides a cylindrical cell accommodation space having a circular cross-section and extending in a length direction of the type-1 battery cell and the series of type-2 battery cells for accommodating the type-1 battery cell and the series of type-2 battery cells together.

According to one or more embodiments, a battery module includes: a first battery pack; and a series of second battery packs arranged along a circumference of the first battery pack to surround the first battery pack. Each of the first battery pack and the series of second battery packs includes: a type-1 battery cell; and a series of type-2 battery cells arranged along a circumference of the type-1 battery cell to surround the type-1 battery cell. The series of type-2 battery cells are connected in parallel to the type-1 battery cell, and each of the series of type-2 battery cells have an output power and a capacity different than an output power and a capacity of the type-1 battery cell.

For example, the first battery pack may have a circular cross-section with a third diameter, and each of the series of second battery packs may have a circular cross-section with a fourth diameter.

For example, the third diameter and the fourth diameter may be equal to each other, and a number of the series of second battery packs arranged along the circumference of the first battery pack may be 6.

According to one or more embodiments, a power supply device includes a series of such battery modules, wherein the series of battery modules are arranged in first and second rows, wherein the battery modules in the first row and the battery modules in the second row are staggered with respect to each other, and wherein the battery modules in the first row and the battery modules in the second row are inserted between each other.

DETAILED DESCRIPTION

Figure 1:
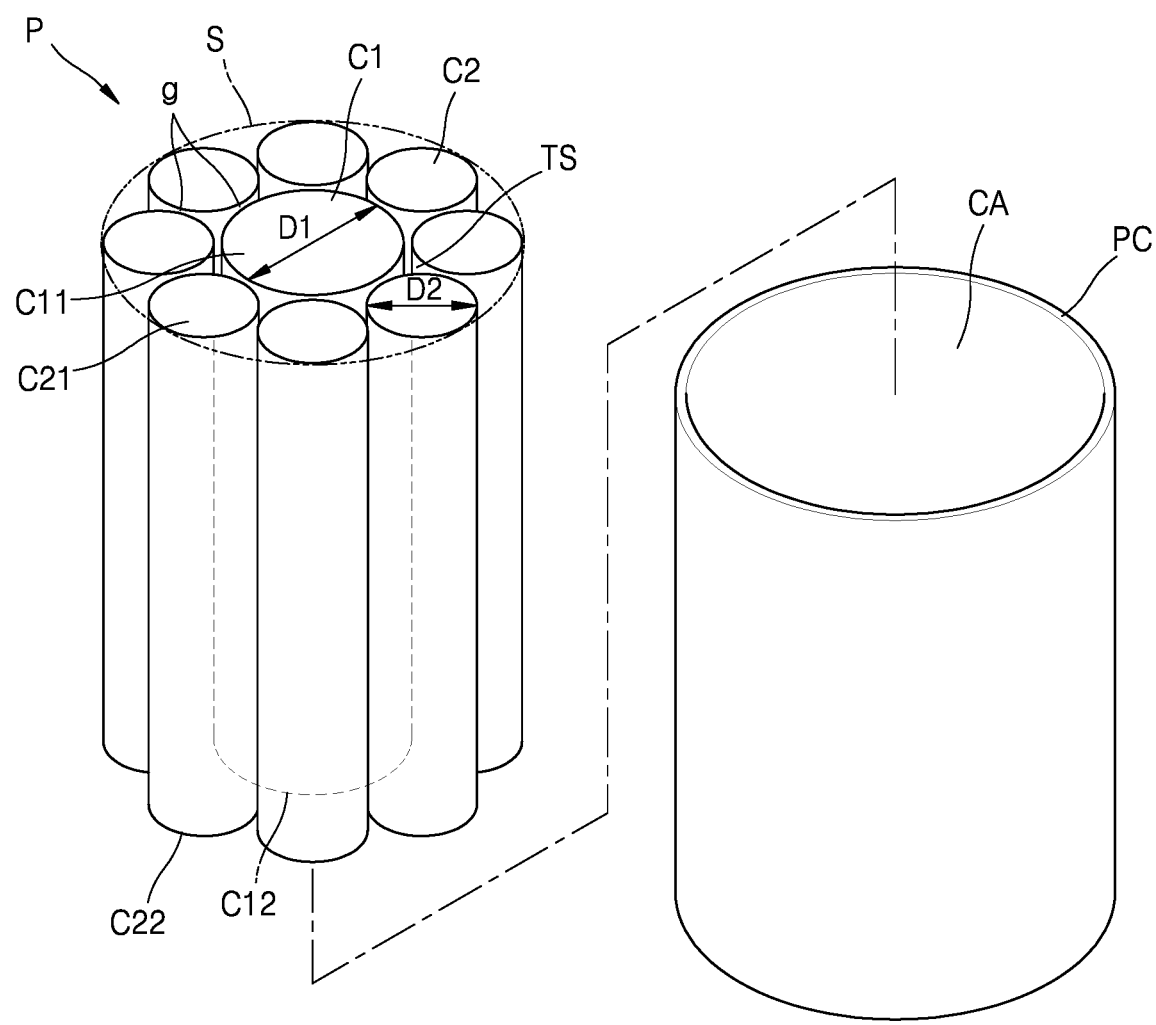
FIG. 1 is an exploded perspective view illustrating a battery pack according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a battery pack, a battery module, and a power supply device will be described according to embodiments with reference to the accompanying drawings.

Figure 2:
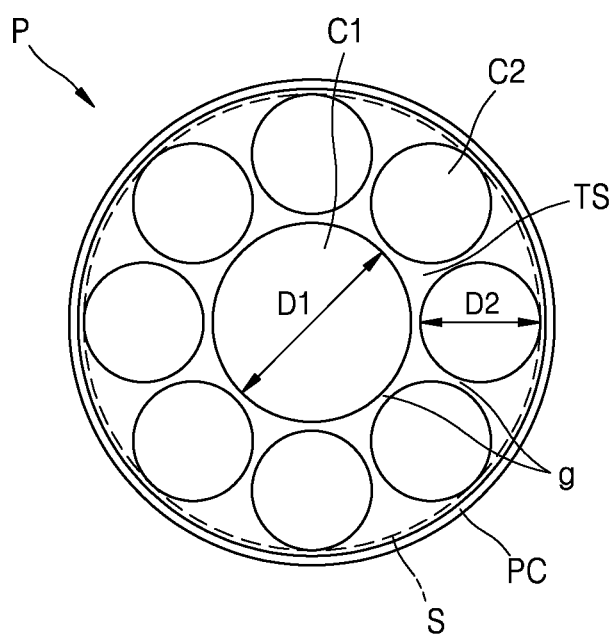
FIG. 2 is a cross-sectional view illustrating the battery pack shown in FIG. 1.

FIG. 1 is an exploded perspective view illustrating a battery pack P according to an embodiment. FIG. 2 is a cross-sectional view illustrating the battery pack P shown in FIG. 1.

Referring to FIGS. 1 and 2, according to an embodiment, the battery pack P may include a type-1 battery cell C1 and a plurality of type-2 battery cells C2 which are arranged around (e.g., circumferentially around) the type-1 battery cell C1 to surround the type-1 battery cell C1.

In an embodiment, the type-1 battery cell C1 may be a high-power battery cell having a function of instantaneously or substantially instantaneously outputting power, and the number of type-1 battery cells C1 included in the battery pack P may be one. Unlike the type-1 battery cell C1, the type-2 battery cells C2 may be high-capacity battery cells having a function of outputting power for a longer period of time, and the battery pack P may include a plurality of type-2 battery cells C2 to have a high capacity.

In an embodiment, the type-1 battery cell C1 may have an output power density higher than that of each of the type-2 battery cells C2 to output higher power than the type-2 battery cells C2. Here, the term "output power density" is used for compare output power levels of battery cells and may be expressed in power (watt)/volume (liter). For example, the output power density may refer to the maximum output power (watt) per unit volume (liter) of a battery cell in a state in which the battery cell has no deterioration in lifecycle characteristics, and for example, the output power density may refer to the maximum output power (watt) per unit volume (liter) of a battery cell for predetermined cycles during which the life of the battery cell is maintained.

In an embodiment, each of the type-2 battery cells C2 may have a higher energy density than the type-1 battery cell C1 to provide a higher capacity than the type-1 battery cell C1. Here, the term "energy density" is used to compare the capacities of battery cells and may refer to the energy (Wh) per unit volume (liter) of a battery cell under standard charge-discharge conditions (for example, charge at 0.5 C and discharge at 0.2 C).

In an embodiment, the type-1 battery cell C1 may prevent or mitigate against deterioration of the type-2 battery cells C2 by instantaneously or substantially instantaneously outputting high power quickly in response to a peak load, and the type-2 battery cells C2 may be responsible for guaranteeing long-term high capacity of the battery pack P.

The type-1 battery cell C1 and the type-2 battery cells C2 may be electrically connected to each other, and as described later, the type-1 battery cell C1 and the type-2 battery cells C2 may be connected in parallel to each other by connecting first and second electrodes C11 and C12 of the type-1 battery cell C1 to the first and second electrodes C21 and C22, respectively, of the type-2 battery cell C2, such that the type-1 battery cell C1 and the type-2 battery cell C2 may interact with each other by internally supplementing current for each other. For example, the type-1 battery cell C1 and the type-2 battery cells C2 may cooperate with each other to cope with power request from an external load. For example, when an external load requests basic power, the type-1 battery cell C1 and the type-2 battery cells C2 may output power together (jointly), and when the external load requests peak power, the type-1 battery cell C1 may instantaneously output high power and the type-2 battery cells C2 may output current to compensate the type-1 battery cell C1 for a decrease in capacity. As described above, in an embodiment, the type-1 battery cell C1 quickly outputs high power in a peak load condition, and the type-2 battery cells C2 supplement the reduced capacity of the type-1 battery cell C1, such that the capacity of the battery pack P may be improved. In the related art, when the type-2 battery cell C2 having high capacity outputs high power, the lifespan of the battery pack P may decrease. However, according to embodiments of the present disclosure, the battery pack P is configured to cope with high-power and high-capacity requests by connecting the high-power type-1 battery cell C1 capable of instantaneously outputting high power in parallel with the high-capacity type-2 battery cells C2 capable of supplementing a decrease in the capacity of the type-1 battery cell C1.

In an embodiment, the type-1 battery cell C1 is a high-power battery cell having a function of instantaneously or substantially instantaneously outputting high power, and each of the type-2 battery cells C2 is high-capacity battery cell having a function of outputting power for a long period of time. That is, the type-1 battery cell C1 and the type-2 battery cell C2 may be battery cells having different output characteristics. In an embodiment, the type-1 battery cell C1 having relatively high output power and the type-2 battery cell C2 having relatively high capacity may have different internal resistances and exhibit different voltage drops under the same first discharge condition. For example, under a first discharge condition of 1.5 C to 2.0 C from the same open circuit voltage (OCV), the discharge voltage of the high-power type-1 battery cell C1 having a relatively low internal resistance may decrease relatively gently, but the discharge voltage of the high-capacity type-2 battery cell C2 having a relatively high internal resistance may decrease relatively rapidly. That is, in the same first discharge condition, the voltage drop of the high-power type-1 battery cell C1 may be less than the voltage drop of each of the high-capacity type-2 battery cells C2. As described above, under the same first discharge condition high rate discharge (1.5 C to 2.0 C), the high-power type-1 battery cell C1 and the high-capacity type-2 battery cell C2 may exhibit different voltage drops, and under the same second discharge condition of the low rate discharge, the high-power type-1 battery cell C1 and each of the high-capacity type-2 battery cells C2 may have different capacities. For example, the high-output type-1 battery cell C1 may be less than the high-capacity type-2 battery cell C2 in the capacity for being completely discharged from the same OCV under the second discharge condition. In one or more embodiments, the first discharge condition and the second discharge condition may respectively correspond to a relatively high rate discharge condition and a relatively low rate discharge condition. For example, the second discharge condition for comparing the capacity of the type-1 battery cell C1 with the capacity of each of the type-2 battery cells C2 may be a relatively low rate discharge condition compared with the first discharge condition for comparing the voltage drop of the type-1 battery cell C1 with the voltage drop of the type-2 battery cell C2, and the capacity of the type-1 battery cell C1 and the capacity of the type-2 battery cell C2 may be more accurately measured under a low rate discharge condition.

Figure 3A:
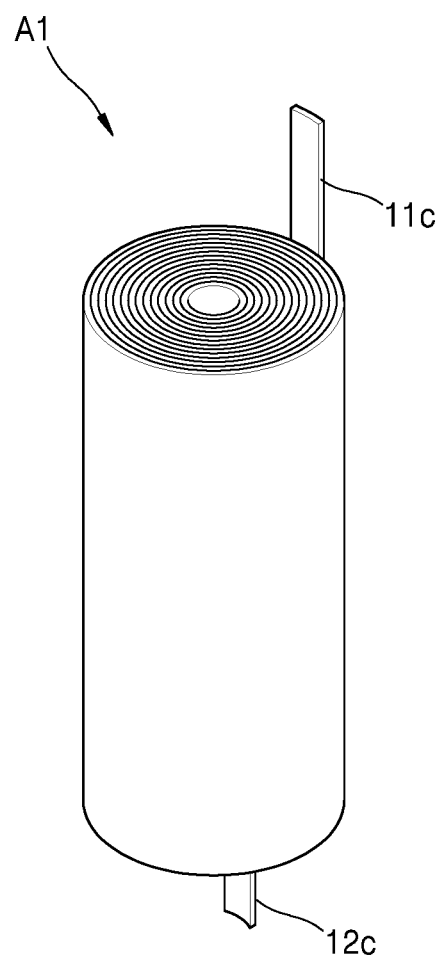
FIGS. 3A to 3C are views illustrating a first electrode assembly of a type-1 battery cell, FIG. 3A being a perspective view illustrating the first electrode assembly, FIG. 3B being an exploded perspective view illustrating an unwound state of the first electrode assembly shown in FIG. 3A, and FIG. 3C being a cross-sectional view taken along line C-C' to illustrate the first electrode assembly shown in FIG. 3B.
Figure 3B:
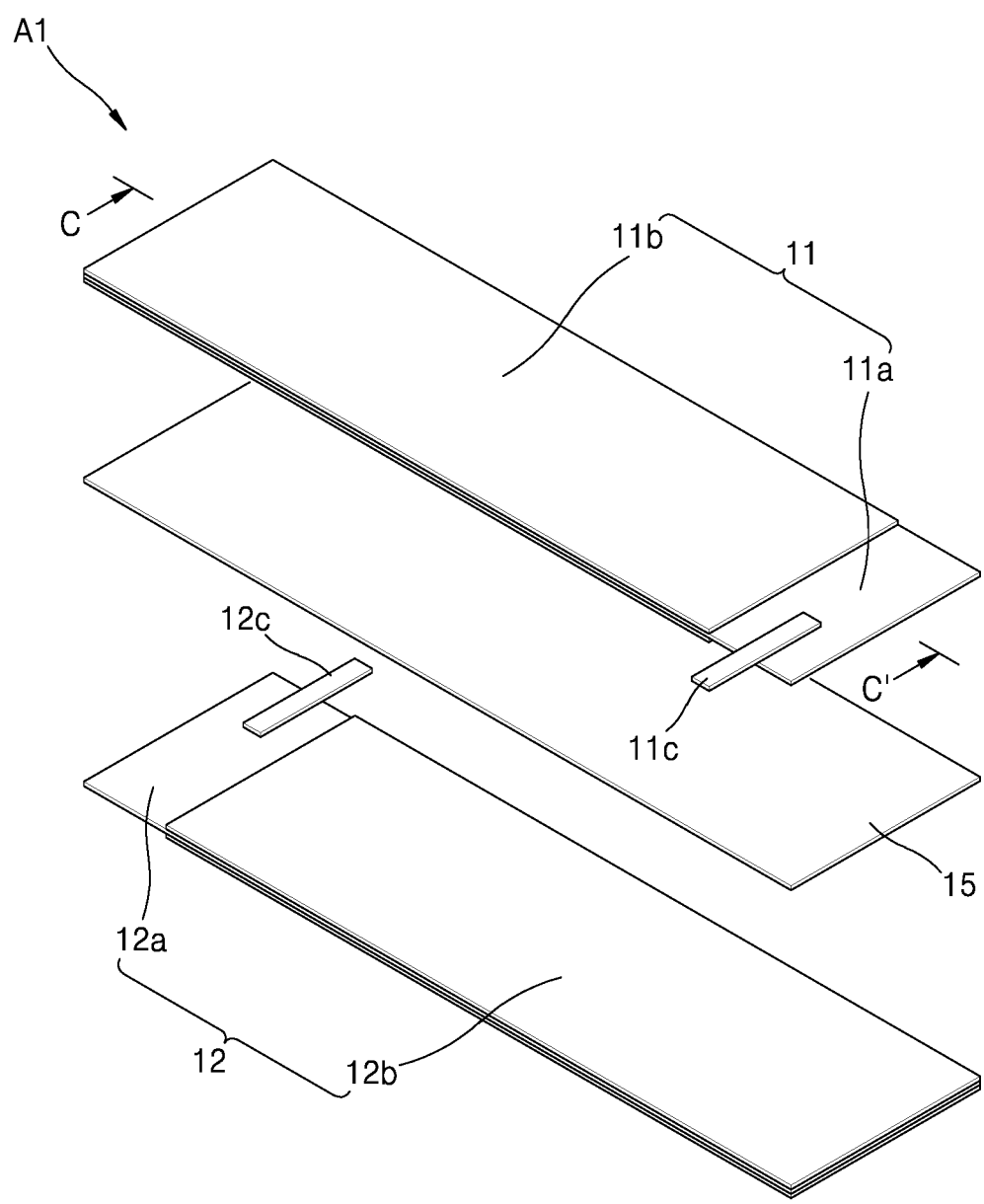
Figure 3C:
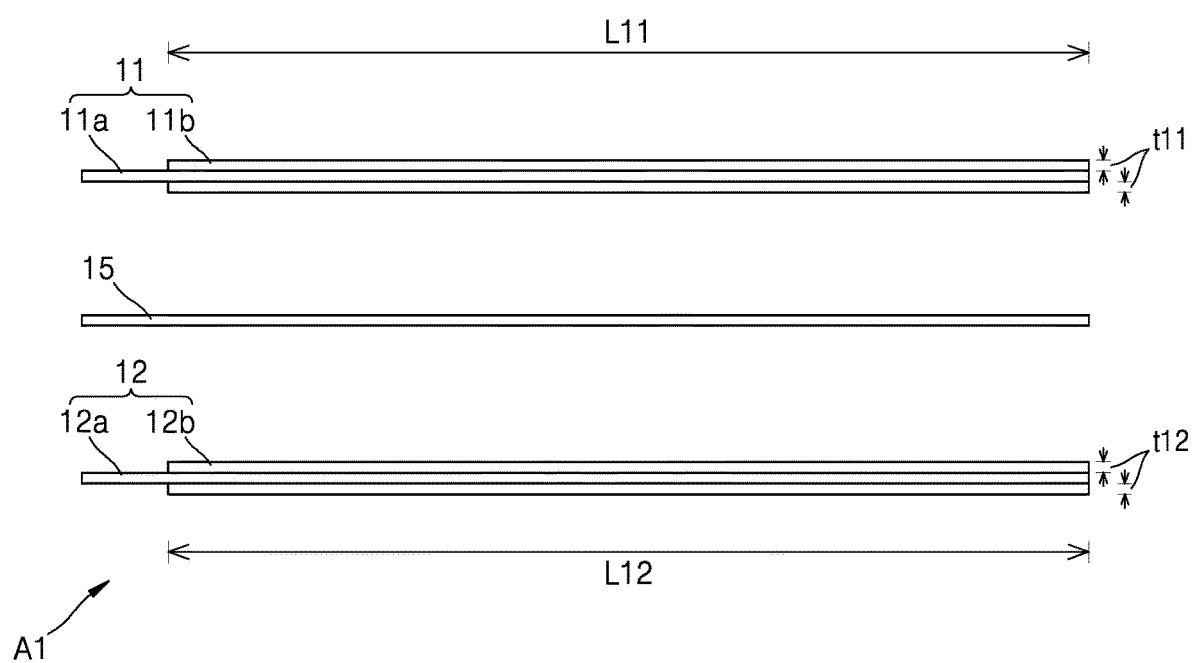

FIGS. 3A to 3C are views illustrating a first electrode assembly A1 of the type-1 battery cell C1. FIG. 3A is a perspective view illustrating the first electrode assembly A1, FIG. 3B is an exploded perspective view illustrating an unwound state of the first electrode assembly A1 shown in FIG. 3A, and FIG. 3C is a cross-sectional view taken along line C-C' to illustrate the first electrode assembly A1 shown in FIG. 3B.

Referring to FIG. 3A to 3C, the type-1 battery cell C1 may include: first and second electrode plates 11 and 12 arranged to face each other; and a first separator 15 arranged between the first and second electrode plates 11 and 12. The first and second electrode plates 11 and 12 arranged to face each other may correspond to a positive electrode plate and a negative electrode plate which have opposite polarities. For example, the first electrode plate 11 may include first positive electrode active material layers 11b which are formed on a first positive electrode base material 11a, and the second electrode plate 12 may include first negative electrode active material layers 12b which are formed on a first negative electrode base material 12a.

In an embodiment, the type-1 battery cell C1 may include the first electrode assembly A1 formed by winding the first and second electrode plates 11 and 12 in a roll form (e.g., a jelly roll) with the first separator 15 being arranged between the first and second electrode plates 11 and 12. However, the first electrode assembly A1 is not limited to a wound type having a roll shape, and in another embodiment, the first electrode assembly A1 may be a stacked type in which a plurality of first and second electrode plates 11 and 12 are stacked with separators 15 therebetween. Furthermore, FIGS. 3A and 3B illustrate a first positive electrode tab 11c and a first negative electrode tab 12c which are respectively formed on the first positive electrode base material 11a and the first negative electrode base material 12a of the first and second electrode plates 11 and 12.

Figure 4A:
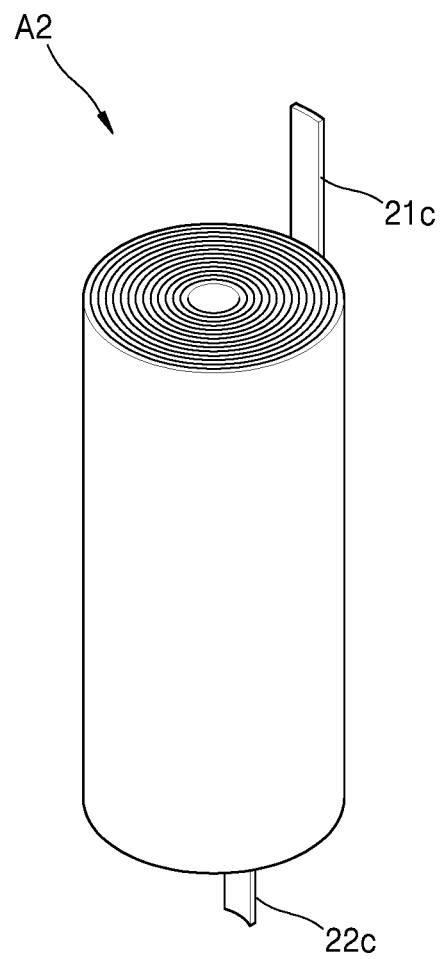
FIGS. 4A and 4B are views illustrating a second electrode assembly of each of type-2 battery cells, FIG. 4A being a perspective view illustrating the second electrode assembly, and FIG. 4B being a cross-sectional view illustrating the second electrode assembly.
Figure 4B:
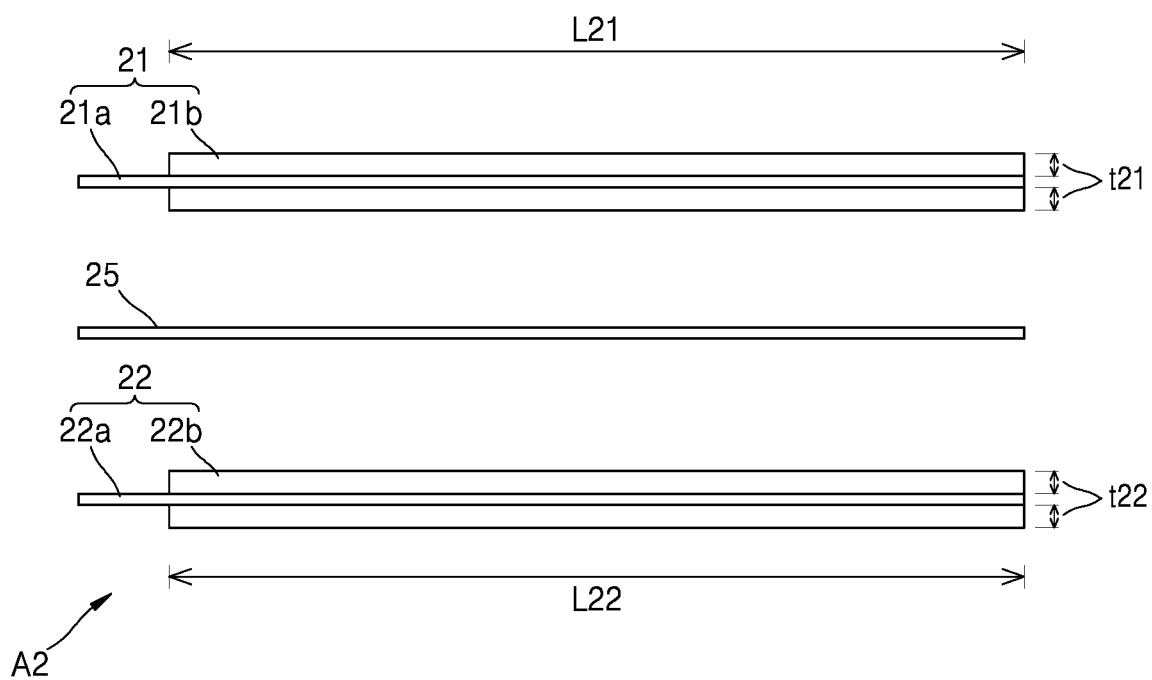

FIGS. 4A and 4B are views illustrating a second electrode assembly A2 of each of the type-2 battery cells C2. FIG. 4A is a perspective view illustrating the second electrode assembly, and FIG. 4B is a cross-sectional view illustrating the second electrode assembly A2.

Referring to FIGS. 4A and 4B, each of the type-2 battery cells C2 may include: third and fourth electrode plates 21 and 22 arranged to face each other; and a second separator 25 arranged between the third and fourth electrode plates 21 and 22. The third and fourth electrode plates 21 and 22 arranged to face each other may respectively correspond to a positive electrode plate and a negative electrode plate which have opposite polarities. For example, the third electrode plate 21 may include second positive electrode active material layers 21b which are formed on a second positive electrode base material 21a, and the fourth electrode plate 22 may include second negative electrode active material layers 22b which are formed on a second negative electrode base material 22a.

In an embodiment, each of the type-2 battery cells C2 may include the second electrode assembly A2 formed by winding the third and fourth electrode plates 21 and 22 in a roll form (e.g., a jelly roll) with the second separator 25 being arranged between the third and fourth electrode plates 21 and 22. However, the second electrode assembly A2 is not limited to the wound type having a roll shape, and in another embodiment, the second electrode assembly A2 may be a stacked type in which a plurality of third and fourth electrode plates 21 and 22 are stacked with second separators 25 therebetween. In addition, FIG. 4A illustrates a second positive electrode tab 21c and a second negative electrode tab 22c which are respectively formed on the second positive electrode base material 21a and the second negative electrode base material 22a of the third and fourth electrode plates 21 and 22.

In an embodiment, the first electrode assembly A1 may have an output power density greater than that of the second electrode assembly A2 such that the first electrode assembly A1 may output relatively higher power compared with the second electrode assembly A2. For example, in one or more embodiments, the amounts of the first positive electrode active material layers 11b and the first negative electrode active material layers 12b provided in the first electrode assembly A1 may be related to the output power density of the first electrode assembly A1, and to increase the output power density of the first electrode assembly A1, the thickness t11 of the first positive electrode active material layers 11b and the thickness t12 of the first negative electrode active material layers 12b may be relatively small. In an embodiment, the thickness t11 of the first positive electrode active material layers 11b provided in the first electrode assembly A1 may be less than the thickness t21 of the second positive electrode active material layers 21b provided in the second electrode assembly A2, and the thickness t12 of the first negative electrode active material layers 12b provided in the first electrode assembly A1 may be less than the thickness t22 of the second negative electrode active material layers 22b provided in the second electrode assembly A2.

As described above, the first positive electrode active material layers 11b and the first negative electrode active material layers 12b have relatively smaller thicknesses t11 and t12 than the thicknesses t21 and t22. However, the volumes of the first positive electrode active material layers 11b and the first negative electrode active material layers 12b may be maintained to maintain the capacity of the first electrode assembly A1, and to this end, the length L11 of the first positive electrode active material layers 11b and the length L21 of the second negative electrode active material layers 22b may be relatively large. For example, in one embodiment, the thicknesses t11 and t12 of the first positive electrode active material layers 11b and the first negative electrode active material layers 12b provided in the first electrode assembly A1 may be about ⅓ of the thickness of active layers of the related art, but the lengths L11 and L12 of the first positive electrode active material layers 11b and the first negative electrode active material layers 12b may be about three times the length of the active layers of the related art to maintain the volumes of the first positive electrode active material layers 11b and the first negative electrode active material layers 12b to be equal to the volume of the active layers of the related art. In the illustrated embodiment, the lengths L11 and L12 of the first positive electrode active material layers 11b and the first negative electrode active material layers 12b may refer to lengths measured in the winding direction of the first electrode assembly A1, and as described later, the lengths L21 and L22 of the second positive electrode active material layers 21b and the second negative electrode active material layers 22b may refer to lengths measured in the winding direction of the second electrode assembly A2.

In an embodiment, the thicknesses t11 and t12 of the first positive electrode active material layers 11b and the first negative electrode active material layers 12b provided in the first electrode assembly A1 may be about ⅓ of the thicknesses t21 and t22, respectively, of the second positive electrode active material layers 21b and the second negative electrode active material layers 22b provided in the second electrode assembly A2, and the lengths L11 and L12 of the first positive electrode active material layers 11b and the first negative electrode active material layers 12b provided in the first electrode assembly A1 may be about three times the lengths L21 and L22, respectively, of the second positive electrode active material layers 21b and the second negative electrode active material layers 22b provided in the second electrode assembly A2.

In an embodiment, as a configuration for increasing the output power density of the first electrode assembly A1, the thicknesses t11 and t12 of the first positive electrode active material layers 11b and the first negative electrode active material layers 12b provided in the first electrode assembly A1 are set to be relatively smaller, but in another embodiment, as another configuration for increasing the output power density of the first electrode assembly A1, the mixture density of the first positive electrode active material layers 11b and the first negative electrode active material layers 12b may be set to be lower. For example, in another embodiment, the mixture density of the first positive electrode active material layers 11b and the first negative electrode active material layers 12b provided in the first electrode assembly A1 may be lower than the mixture density of the second positive electrode active material layers 21b and the second negative electrode active material layers 22b provided in the second electrode assembly A2. Even in this embodiment in which the mixture density of the first positive electrode active material layers 11b and the first negative electrode active material layers 12b provided in the first electrode assembly A1 is less than the mixture density of the second positive electrode active material layers 21b and the second negative electrode active material layers 22b provided in the second electrode assembly A2, the capacity of the first electrode assembly A1 is maintained by adjusting the lengths L11 and L12 of the first positive electrode active material layers 11b and the first negative electrode active material layers 12b provided in the first electrode assembly A1 to be greater than the lengths L21 and L22, respectively, of the second positive electrode active material layers 21b and the second negative electrode active material layers 22b provided in the second electrode assembly A2.

In the embodiment illustrated in FIGS. 1 and 2, the type-1 battery cell C1 and the type-2 battery cell C2 may be circular battery cells having a circular cross-sectional shape with a first diameter D1 and a second diameter D2, respectively. That is, the type-1 battery cell C1 may have an outer circumferential surface along a circular cross section having the first diameter D1, and each of the type-2 battery cells C2 may have an outer circumferential surface along a circular cross section having the second diameter D2, and the type-2 battery cells C2 may be arranged along the outer peripheral surface of the type-1 battery cell C1.

Figure 5A:
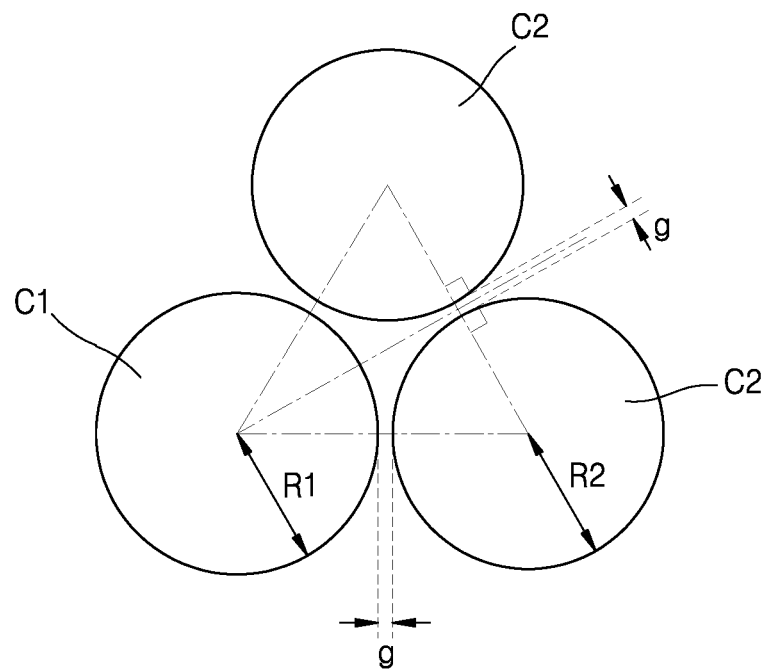
FIG. 5A is a view illustrating an arrangement of the type-1 battery cell and the type-2 battery cells according to an embodiment.

FIG. 5A is a view illustrating an arrangement of the type-1 battery cell C1 and the type-2 battery cells C2 according to an embodiment. Referring to FIGS. 1, 2, and 5A together, in an embodiment, the number of type-2 battery cells C2 arranged along the circumference of the type-1 battery cell C1 may be determined according to the first diameter D1 of the type-1 battery cell C1 and the second diameter D2 of the type-2 battery cell C2, and may also be determined according to the gap (g) between the type-2 battery cells C2 arranged along the circumference of the type-1 battery cell C1. That is, the length of the outer circumferential surface of the type-1 battery cell C1 may be determined according to the first diameter D1 of the type-1 battery cell C1, and the type-2 battery cells C2 having the second diameter D2 may be arranged with a gap (g) therebetween along the length of the outer peripheral surface of the type-1 battery cell C1. In the illustrated embodiment, the gap (g) between adjacent type-2 battery cells C2 may refer to a gap (g) measured in the circumferential direction of the type-1 battery cell C1, and for example, the gap (g) may a gap (g) between mutually-facing outer circumferential surfaces of adjacent type-2 battery cells C2. For example, when a plurality of type-2 battery cells C2 are arranged along an arc of the type-1 battery cell C1, a clearance space or a dead space TS (see FIGS. 1 and 2) may be formed between type-2 battery cells C2 which are adjacent to each other and make contact with the arc of the type-1 battery cell C1, and throughout the present specification, the gap (g) between adjacent type-2 battery cells C2 may refer to a gap (g) between mutually-facing outer circumferential surfaces of adjacent type-2 battery cells C2, that is, a gap (g) between mutually-facing outer circumferential surfaces of adjacent type-2 battery cells C2 in mutually-facing directions (corresponding to the circumferential direction of the type-1 battery cell C1). As described above, in various embodiments, the gap (g) may refer to a gap (g) between mutually-facing outer circumferential surfaces of type-2 battery cells C2 which are adjacent to each other in the circumferential direction of the type-1 battery cell C1, and such gaps (g) may be formed between the type-1 battery cell C1 and the type-2 battery cells C2 surrounding the type-1 battery cell C1. In this embodiment, a dead space TS (shown in FIGS. 1 and 2), which is formed between type-2 battery cells C2 adjacent to each other and contacting an arc of the type-1 battery cell C1, may include gaps (g) between the type-1 battery cell C1 and the adjacent type-2 battery cell C2. For example, a dead space TS including gaps (g) between the type-1 battery cell C1 and the type-2 battery cell C2 may be formed in such a manner that the dead space TS exists between two type-2 battery cells C2, which are adjacent to each other and make contact with an arc of the type-1 battery cell C1, and in this embodiment, the dead space TS may include: three portions which concavely converge toward gaps (g) between the type-1 battery cell C1 and the two adjacent type-2 battery cells C2; and a space formed in a columnar shape in the lengthwise direction of the type-1 battery cell C1.

In various embodiments, a gap (g) may refer to a minimum space between adjacent battery cells C1 and C2, and for example, the gap (g) may include: gaps (g) between the type-2 battery cells C2 adjacent to each other in the circumferential direction of the type-1 battery cell C1 (that is, gaps (g) between the type-2 battery cells C2); and gaps (g) between the type-1 battery cell C1 and the type-2 battery cell C2 surrounding the type-1 battery cell C1 (that is, gap (g) between the type-1 battery cell C1 and the type-2 battery cell C2). Accordingly, the gap (g) may refer to a minimum space between adjacent battery cells C1 and C2 of the battery pack P. The gap (g) may refer to a minimum space between adjacent battery cells C1 and C2 of the battery pack P that is configured (or guaranteed) to block thermal and electrical interference between the adjacent battery cells C1 and C2. In other words, thermal and electrical interference between adjacent battery cells C1 and C2 may be blocked due to the gap (g), and for example, due to gaps (g) between the type-1 battery cell C1 and each of the type-2 battery cells C2, thermal interference from the type-1 battery cell C1, which generates a relatively larger amount of heat, to the type-2 battery cell C2, which generate a relatively smaller amount of heat, may be blocked or substantially blocked. As described later, in an embodiment, since the type-2 battery cells C2 which generate a relatively smaller amount of heat are arranged along the circumference of the type-1 battery cell C1 which generates a relatively larger amount of heat, heat propagation may be facilitated from the type-1 battery cell C1 (which emits a relatively large amount of heat) to the type-2 battery cells C2 (which emit a relatively small amount of heat). In this embodiment, the gaps (g) formed between the type-1 battery cell C1 and the type-2 battery cell C2 may prevent (or at least mitigate against) the type-2 battery cell C2 from be damaged by excessive heat propagation from the type-1 battery cell C1.

In an embodiment, the gaps (g) between the type-2 battery cells C2 which are adjacent to each other may be equal to the gaps (g) between the type-1 battery cell C1 and each of the type-2 battery cells C2. As described later, in Equation 1, "g" may refer to the gaps (g) between the type-2 battery cells C2 and the gaps (g) between the type-1 battery cell C1 and the type-2 battery cell C2, and for example, g may refer to the gap (g) between the type-2 battery cells C2 and the gaps (g) between the type-1 battery cell C1 and the type-2 battery cell C2 which are set to have the same dimension as expressed in Equation 1. In the accompanying drawings of the present specification, the gap (g) between the type-2 battery cells C2 and the gap (g) between the type-1 battery cell C1 and each of the type-2 battery cells C2 are denoted with the same letter for ease of illustration. In various embodiments such as the embodiment shown in FIG. 5B, however, the gap g1 between adjacent type-2 battery cells C2 and the gap g2 between the type-1 battery cell C1 and each of the type-2 battery cells C2 may have different dimensions.

The gaps (g) between the type-2 battery cells C2 adjacent to each other may be related to the number of type-2 battery cells C2 arranged around the type-1 battery cell C1, and may be set based on the first and second diameters D1 and D2 of the type-1 battery cell C1 and the type-2 battery cells C2 and the number of type-2 battery cells C2 arranged around the type-1 battery cell C1. In the following description, unless otherwise specified, a gap (g) or gaps (g) may refer to the gaps (g) between adjacent type-2 battery cells C2 which are related to the number of type-2 battery cells C2 arranged around the type-1 battery cell C1.

In various embodiments, gaps (g) may be formed or may not be present between the adjacent type-2 battery cells C2 according to the first diameter D1 of the type-1 battery cell C1, the second diameter D2 of the type-2 battery cells C2, and the number of type-2 battery cells C2 arranged around the type-1 battery cell C1. As described later, when the first and second diameters D1 and D2 are equal to each other and six type-2 battery cells C2 are arranged around the type-1 battery cell C1, no gaps (g) may be formed between the type-2 battery cells C2 which are adjacent to each other (refer to FIG. 6A).

Referring to FIG. 5A, the number (n) of type-2 battery cells C2 arranged around the type-1 battery cell C1 and the first and second diameters D1 and D2 of the type-1 battery cell C1 and the type-2 battery cell C2, respectively, may have a relationship with the gaps (g) between the type-2 battery cells C2 as expressed in Equation 1 below. In FIG. 5A and Equation 1, R1 refers to a first radius which may be half the first diameter D1 of the type-1 battery cell C1, and R2 refers to a second radius which may be half the second diameter D2 of each of the type-2 battery cells C2.

$$R2 = \frac{R1 \times \sin\left(\frac{\pi}{2}\right) + g \times \sin\left(\frac{\pi}{n}\right) - \frac{g}{2}}{1 - \sin\left(\frac{\pi}{n}\right)} \qquad \text{Equation 1}$$

Referring to FIG. 5A, Equation 1 shown above may be obtained by applying a trigonometric function to right triangles bisecting a triangle which connects the center of the type-1 battery cell C1 and the centers of two type-2 battery cells C2 adjacent to each other along or around the circumference of the type-1 battery cell C1.

Figure 5B:
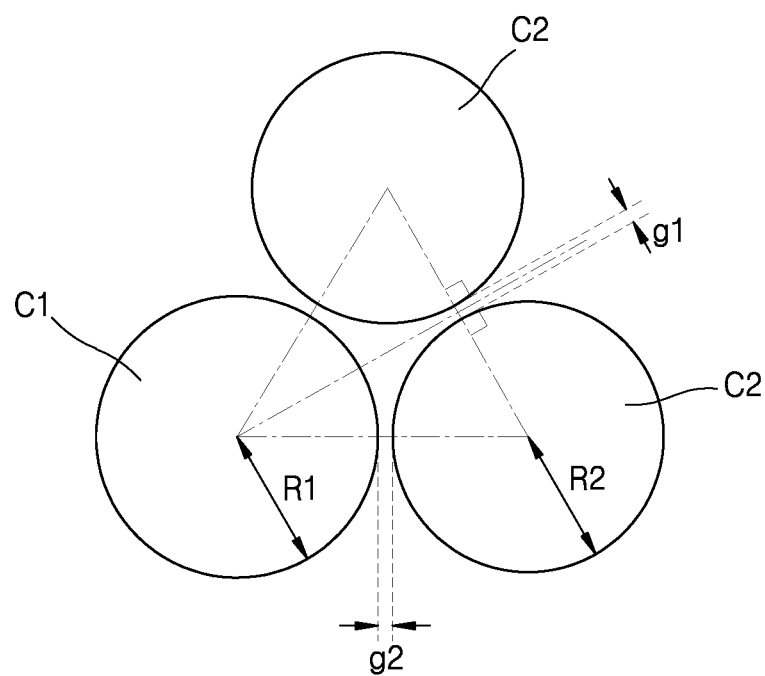
FIG. 5B is a view illustrating an arrangement of the type-1 battery cell and the type-2 battery cells according to another embodiment.

FIG. 5B is a view illustrating an arrangement of the type-1 battery cell and the type-2 battery cells according to another embodiment. Referring to FIG. 5B, the gaps g1 between the type-2 battery cells C2 adjacent to each other may be different from the gaps g2 between the type-1 battery cell C1 and each of the type-2 battery cell C2. For example, the gaps g1 between adjacent type-2 battery cells C2 and the gap g2 between the type-1 battery cell C1 and each of the type-2 battery cells C2 may be different from each other depending, for example, on different heating characteristics of the type-1 battery cell C1 and the type-2 battery cells C2.

Referring to FIG. 5B, the number (n) of the type-2 battery cells C2 arranged around the type-1 battery cell C1, the first and second diameters D1 and D2 of the type-1 battery cell C1 and the type-2 battery cell C2, respectively, the gaps g1 between the type-2 battery cells C2 adjacent to each other, and the gaps g2 between the type-1 battery cell C1 and each of the type-2 battery cell C2 may satisfy Equation 2 below. In FIG. 5B and Equation 2, R1 refers to a first radius which may be half of the first diameter D1 of the type-1 battery cell C1, and R2 refers to a second radius which may be half of the second diameter D2 of each of the type-2 battery cells C2.

$$R2 = \frac{R1 \times \sin\left(\frac{\pi}{n}\right) + g2 \times \sin\left(\frac{\pi}{n}\right) - \frac{g1}{2}}{1 - \sin\left(\frac{\pi}{n}\right)} \quad \text{Equation 2}$$

Referring to FIG. 5B, Equation 2 shown above may be obtained by applying a trigonometric function to right triangles bisecting a triangle which connects the center of the type-1 battery cell C1 and the centers of two type-2 battery cells C2 adjacent to each other along or around the circumference of the type-1 battery cell C1.

FIG. 6A to 6D are views depicting structures of the battery pack P according to various embodiments of the present disclosure.

Referring to FIGS. 6A to 6D, in various embodiments, the number of type-2 battery cells C2 arranged in the circumferential direction of the type-1 battery cell C1 may be variously modified, and the first diameter D1 of the type-1 battery cell C1 and the second diameter D2 of each of the type-2 battery cells C2 may be varied according to the number of type-2 battery cells C2. In one or more embodiments, the first diameter D1 of the type-1 battery cell C1 and the second diameter D2 of each of the type-2 battery cells C2 may be variously modified, but the first and second diameters D1 and D2 may correspond to the dimensions of commercially available battery cells rather than arbitrarily selected dimensions. That is, the various sizes of the type-1 battery cell C1 and the type-2 battery cell C2 shown in FIGS. 6A to 6D may correspond to the sizes of commercially available battery cells.

Figure 6A:
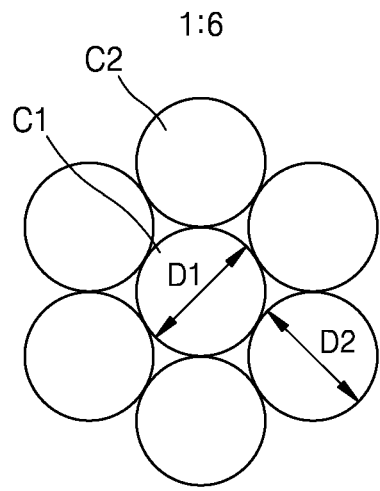
FIG. 6A to 6D are views illustrating structures of the battery pack according to various embodiments.

As shown in FIG. 6A, when the number of type-2 battery cells C2 arranged around the type-1 battery cell C1 is 6, no gaps (g) may be formed between the type-2 battery cells C2 adjacent to each other in the circumferential direction of the type-1 battery cell C1, and mutually-facing outer circumferential surfaces of the type-2 battery cells C2 may be in contact (direct contact) with each other. In the illustrated embodiment, the outer circumferential surfaces of the type-2 battery cells C2 adjacent to each other may refer to outer circumferential surfaces facing each in the circumferential direction of the type-1 battery cell C1. For example, when the number of type-2 battery cells C2 is 6, the first diameter D1 of the type-1 battery cell C1 may be equal to the second diameter D2 of each of the type-2 battery cells C2, and the outer circumferential surfaces of the type-2 battery cells C2 adjacent to each other may be in contact (direct contact) with each other.

Figure 6B:
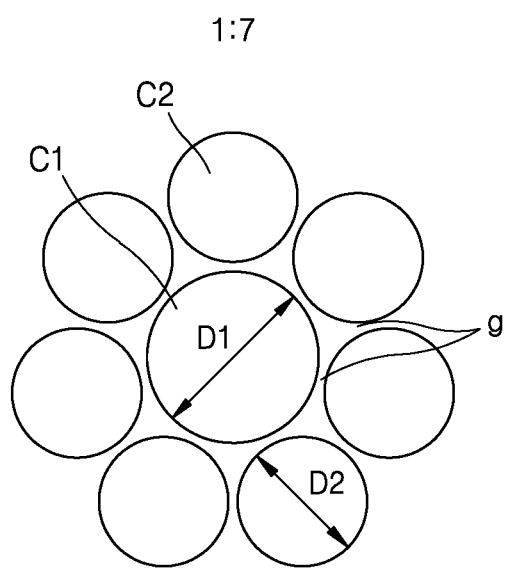
Figure 6C:
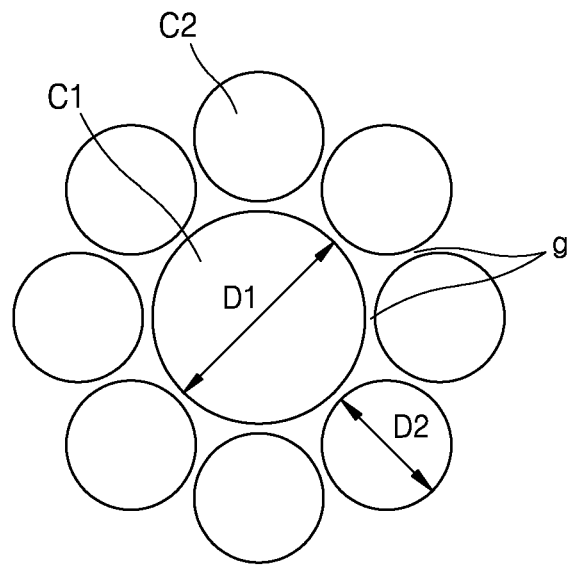
Figure 6D:
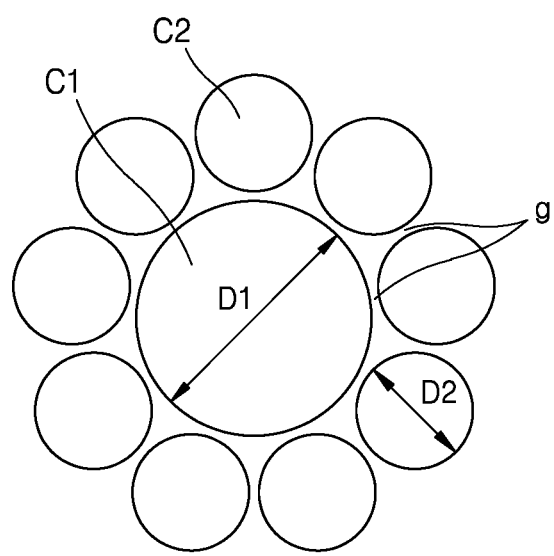

As shown in FIGS. 6B to 6D, when the number of type-2 battery cells C2 arranged around the type-1 battery cell C1 ranges from 7 to 9 (i.e., the number of type-2 battery cells C2 is 7, 8, or 9), gaps (g) may be formed between the outer circumferential surfaces of the type-2 battery cells C2 adjacent to each other, and the outer circumferential surfaces of the type-2 battery cells C2 adjacent to each other may not be in contact (direct contact) with each other. In various embodiments, the number of type-2 battery cells C2 arranged around the type-1 battery cell C1 may be set to be minimally 7 and maximally 9. As shown in FIG. 6A, when the number of type-2 battery cells C2 is 6, since the outer circumferential surfaces of the type-2 battery cells C2 adjacent to each other along the circumference of the type-1 battery cell C1 are in contact with each other, heat may propagate between the type-2 battery cells C2 which are adjacent to each other and in contact with each other, and for example, any one of the type-2 battery cells C2 arranged in contact with each other along the circumference of the type-1 battery cell C1 may undergo high-temperature deterioration and cause thermal runaway along the circumference of the type-1 battery cell C1. In addition, the outer circumferential surfaces of the type-2 battery cells C2 may have a polarity of the type-2 battery cells C2, and a short circuit may occur through a contact between the outer circumferential surfaces of the type-2 battery cells C2 adjacent to each other. In an embodiment, although the type-2 battery cells C2 are connected in parallel with each other, when a short circuit occurs through a contact between the outer circumferential surfaces of adjacent type-2 battery cells C2, there is a risk of leakage of charge or discharge current through an uncontrolled charge-discharge path. In addition, as shown in FIG. 6A, when the number of type-2 battery cells C2 is 6, the type-1 battery cell C1 and the type-2 battery cell C2 may be in contact with each other, and no gaps (g) may be formed between the type-1 battery cell C1 and the type-2 battery cells C2 because the type-2 battery cell C2 is in contact with the outer circumferential surface of the type-1 battery cell C1. In this embodiment, excessive heat propagation may occur from the type-1 battery cell C1 (which has relatively high-temperature heating characteristics) to the type-2 battery cell C2 (which has relatively low-temperature heating characteristics), and leakage or electrical interference of charge or discharge current may occur through an uncontrolled charge-discharge path.

In various embodiments, the number of type-2 battery cells C2 may be set to be minimally 7 and maximally 9 to prevent thermal or electrical contact between the type-2 battery cells C2 and/or between the type-1 battery cell C1 and the type-2 battery cells C2 such that heat propagation or thermal runaway caused by thermal contact may be prevented, and a short circuit caused by an electrical contact may be prevented.

Referring to FIG. 6A to 6D, in general, as the number of type-2 battery cells C2 arranged around the type-1 battery cell C1 increases, the first diameter D1 of the type-1 battery cell C1 may increase compared with the second diameter D2 of each of the type-2 battery cells C2. For example, the greater the first diameter D1 of the type-1 battery cell C1, the more type-2 battery cells C2 may be arranged around the outer circumference of the type-1 battery cell C1. For example, as the number of type-2 battery cells C2 arranged around the type-1 battery cell C1 increases, the cross-sectional area of the type-1 battery cell C1 may increase compared with the cross-sectional area of the type-2 battery cell C2, which means an increase of the fraction (or relative proportion) of the type-1 battery cell C1 having a relatively high output power density and a decrease in the fraction (or relative proportion) of the type-2 battery cells C2 having a relatively high energy density. That is, as the number of type-2 battery cells C2 increases, the output power and capacity of the battery pack P may be varied.

Figure 7:
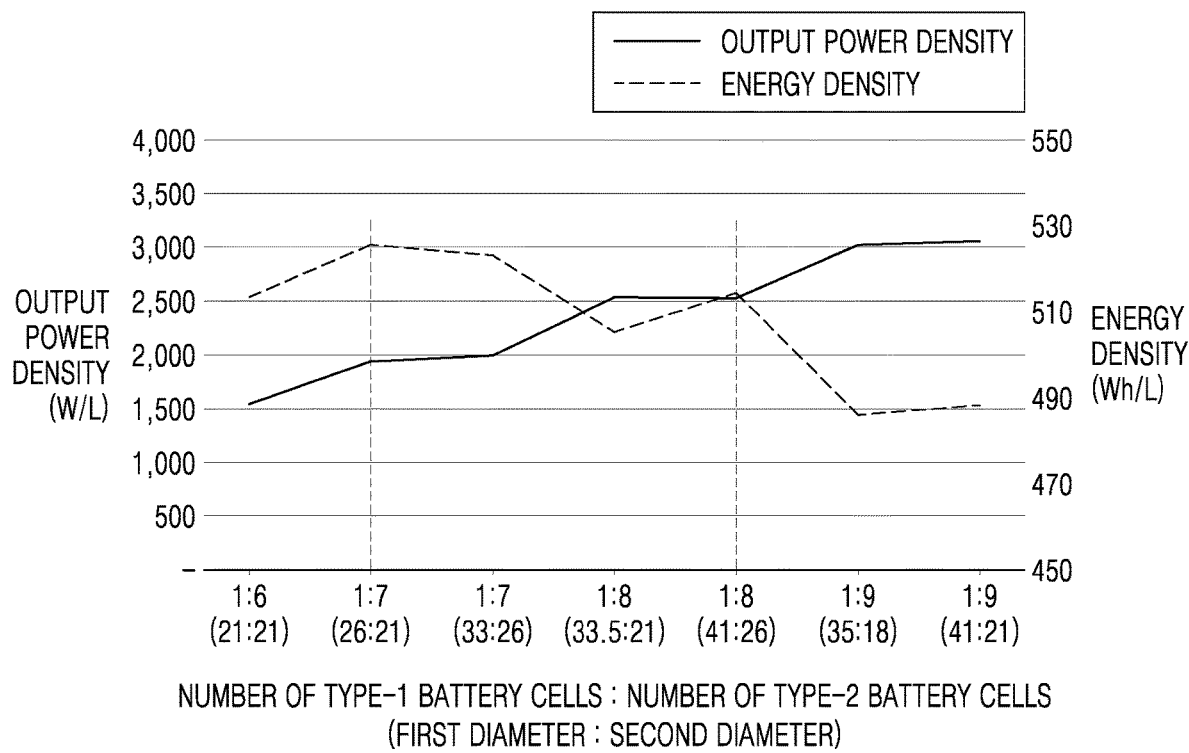
FIG. 7 is a graph illustrating variations in the output power density and energy density of the battery pack according to the ratio of the number of type-1 battery cells and the number of type-2 battery cells.

In various embodiments, although the number of type-2 battery cells C2 arranged around the type-1 battery cell C1 is not varied (i.e., the number of type-2 battery cells C2 is fixed), the first diameter D1 of the type-1 battery cell C1 and the second diameter D2 of each of the type-2 battery cells C2 may be set to have different dimensions. As shown in FIG. 7, even when the number of type-2 battery cells C2 is fixed to 7, 8, or 9, the first diameter D1 of the type-1 battery cell C1 and the second diameter D2 of each of the type-2 battery cells C2 may be varied. For example, even when the number of type-2 battery cells C2 is fixed to 8, the first diameter D1 of the type-1 battery cell C1 and the second diameter D2 of each of the type-2 battery cells C2 may be varied from a combination of about 33.5 mm and about 21 mm to a combination of about 41 mm and about 26 mm. As described above, the ratio of the cross-sectional area of the type-1 battery cell C1 to the cross-sectional area of each of the type-2 battery cells C2 may be varied by varying the first and second diameters D1 and D2, and for example, even when the number of the type-2 battery cells C2 is fixed to eight, the output power and capacity of the battery pack P may be designed differently.

FIG. 7 is a graph illustrating variations in the output power density and energy density of the battery pack P according to the ratio of the number of type-1 battery cells and the number of type-2 battery cells in the battery pack P.

Referring to FIG. 7, the ratio of the number of type-1 battery cells C1 to the number of type-2 battery cells C2 may refer to the number of type-2 battery cells C2 arranged around the type-1 battery cell C1. In addition, FIG. 7 shows the first diameter D1 of the type-1 battery cell C1 and the second diameter D2 of each of the type-2 battery cells C2 together with the ratio of the number of type-1 battery cells C1 and the number of type-2 battery cells C2. As described above, even when the ratio of the number of type-1 battery cells C1 and the number of type-2 battery cells C2 is fixed, the first diameter D1 of the type-1 battery cell C1 and the second diameter D2 of the type-2 battery cell C2 may be selected from among different combinations (shown in FIG. 7) to vary the output power density and energy density of the battery pack P.

Referring to FIG. 7, as the number of type-2 battery cells C2 arranged around the type-1 battery cell C1 increases, the output power density of the battery pack P generally increases, and the energy density of the battery pack P generally decreases. Here, the output power density and the energy density are the output power density and the energy density of the battery pack P including the type-1 battery cell C1 and the type-2 battery cells C2.

The increase in output density with the increase of the number of type-2 battery cells C2 arranged around the type-1 battery cell C1 may be understood as the increase of the output power density of the battery pack P with the increase in the fraction (or relative proportion) of the type-1 battery cell C1 which has a relatively high output power density to instantaneously output high power.

The decrease in energy density with the increase of the number of type-2 battery cells C2 arranged around the type-1 battery cell C1 may be understood as the decrease of the energy density of the battery pack P with the decrease in the fraction (or relative proportion) of the type-2 battery cells C2 which have a relatively high energy density for long-term high capacity.

Referring to FIG. 7, even when the number of type-2 battery cells C2 arranged around the type-1 battery cell C1 is fixed, the fraction (or relative proportion) of the type-1 battery cell C1 and the fraction (or relative proportion) of the type-2 battery cell C2 may be varied by varying the first diameter D1 of the type-1 battery cell C1 and the second diameter D2 of each of the type-2 battery cells C2 according to embodiments of the present disclosure. That is, the output power density and energy density of the battery pack P may be varied without varying the number of type-2 battery cells C2.

Referring to FIG. 7, as the number of type-2 battery cells C2 arranged around the type-1 battery cell C1 is increased from 6 to 7, the output power density and the energy density are increased. This occurrence in which the energy density of the battery pack P increases even when the number of type-2 battery cells C2 is increased may occur as follows: in various embodiments, the first diameter D1 of the type-1 battery cell C1 and the second diameter D2 of each of the type-2 battery cells C2 may be selected from the sizes of commercially available battery cells, and thus the second diameter D2 of each of the type-2 battery cells C2 may not be varied when the number of type-2 battery cells C2 is varied between 6 and 7. For example, even when the number of type-2 battery cells C2 is varied between 6 and 7, the second diameter D2 of each of the type-2 battery cells C2 may be maintained equal to about 21 mm, and thus the battery pack P may have higher energy density when the number of type-2 battery cells C2 is 7 than when the number of type-2 battery cells C2 is 6. That is, as described above, since the second diameter D2 of each of the type-2 battery cell C2 is maintained even when the number of type-2 battery cells C2 increases, the battery pack P may have higher energy density when the number of type-2 battery cells C2 is 7 than when the number of type-2 battery cells C2 is 6.

When the number of the type-2 battery cells C2 is increased from 6 to 7, both the output power density and the energy density increase, and thus, the number of type-2 battery cells C2 may be set to be 7 or more in embodiments of the present disclosure. For example, in various embodiments, the number of type-2 battery cells C2 may be set to be within the range of 7 to 9 (i.e., 7, 8, or 9).

Referring to FIG. 7, when the number of type-2 battery cells C2 is increased from 8 to 9, the energy density of the battery pack P sharply decreases, and thus the number of type-2 battery cells C2 may be set to be 8 or less in some embodiments of the present disclosure. For example, when the number of type-2 battery cells C2 is increased from 8 to 9, the output power density of the battery pack P increases, and the energy density of the battery pack P decreases, and in this case, the decrease in the energy density is greater than the increase in output power density. Therefore, in an embodiment, the number of type-2 battery cells C2 may be set to be 8 or less. For example, in various embodiments, the number of type-2 battery cells C2 may be set to be within the range of 7 to 8 (i.e., number of type-2 battery cells C2 may be 7 or 8).

Figure 8:
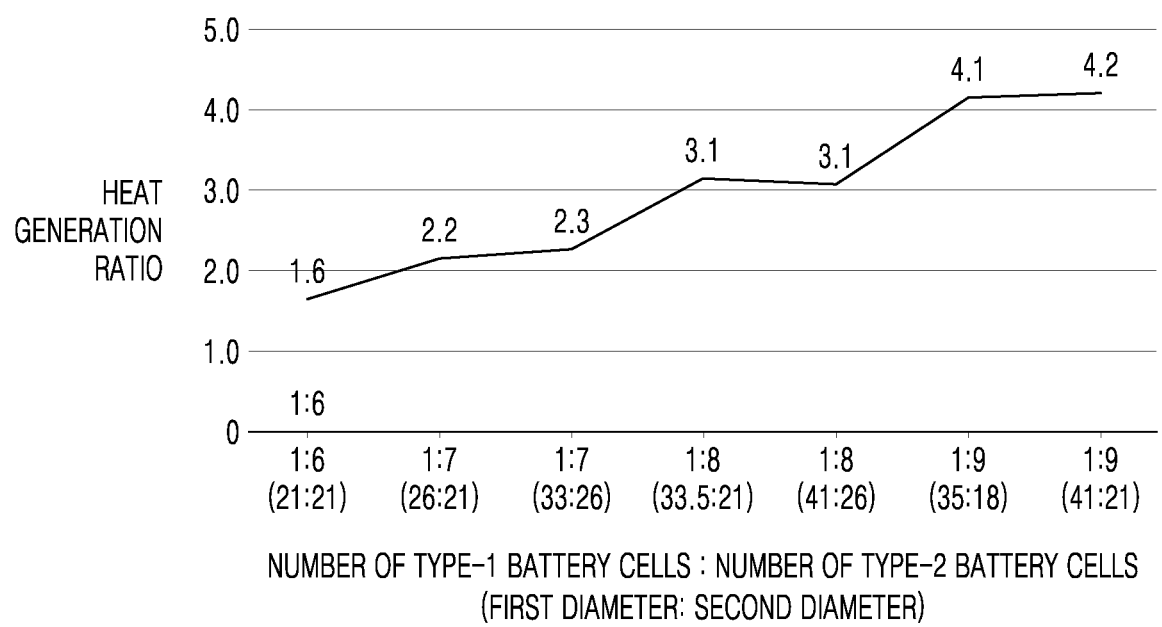
FIG. 8 is a graph illustrating the heat generation ratio of the type-1 battery cell and the type-2 battery cells according to the ratio of the number of type-1 battery cells and the number of type-2 battery cells.

FIG. 8 is a graph illustrating the heat generation ratio of the type-1 battery cell C1 and the type-2 battery cell C2 according to the ratio of the number of type-1 battery cells C1 and the number of type-2 battery cells C2. Here, the heat generation ratio may refer to the amount of heat that the type-1 battery cell C1 generates relative to the amount of heat that the type-2 battery cell C2 generates, that is, the heat generation ratio of the type-1 battery cell C1 to the type-2 battery cell C2 which indicates the ratio of the amount of heat that the type-1 battery cell C1 generates to the amount of heat that the type-2 battery cell C2 generates.

Referring to FIG. 8, the ratio of the number of type-1 battery cells C1 and the number of type-2 battery cells C2 may refer to the number of type-2 battery cells C2 arranged around the type-1 battery cell C1. In addition, FIG. 8 shows the first diameter D1 of the type-1 battery cell C1 and the second diameter D2 of each of the type-2 battery cells C2 together with the ratio of the number of type-1 battery cells C1 and the number of type-2 battery cells C2. Even when the ratio of the number of type-1 battery cells C1 and the number of type-2 battery cells C2 is fixed, the first diameter D1 of the type-1 battery cell C1 and the second diameter D2 of each of the type-2 battery cells C2 may be selected from different combinations (as shown in FIG. 8) as described above to vary the heat generation ratio.

Since the type-1 battery cell C1 instantaneously and quickly outputs high power in response to a peak load, the type-1 battery cell C1 may generate a large amount of heat. However, since the type-2 battery cell C2 is configured to supplement the capacity of the type-1 battery cell C1 or cope with a basic load for a longer period, the amount of heat that the type-2 battery cell C2 generates may be less than the amount of heat that the type-1 battery cell C1 generates. In an embodiment, the type-1 battery cell C1 may rapidly output high power while the type-2 battery cell C2 may supplement the capacity of the type-1 battery cell C1, and for example, since the type-2 battery cells C2 (which generate a relatively small amount of heat) are arranged around the type-1 battery cell C1 (which generate a relatively large amount of heat), a large amount of heat generated by the type-1 battery cell C1 may not be locally accumulated but may be diffused through the type-2 battery cells C2 surrounding the type-1 battery cell C1. That is, since the type-2 battery cells C2 (which generate a relatively small amount of heat) are arranged around the type-1 battery cell C1 (which generate a relatively large amount heat), heat may diffuse from the type-1 battery cell C1 to the type-2 battery cells C2 according to the temperature difference (or the heat generation ratio) between the type-1 battery cell C1 and the type-2 battery cell C2. For example, as the temperature difference (or heat generation ratio) between the type-1 battery cell C1 and the type-2 battery cell C2 increases, heat diffusion from the type-1 battery cell C1 to the type-2 battery cell C2 may be promoted.

Referring to FIG. 8, as the number of type-2 battery cells C2 arranged around the type-1 battery cell C1 increases, the heat generation ratio of the type-1 battery cell C1 to the type-2 battery cells C2 increases. That is, as the number of type-2 battery cells C2 arranged around the type-1 battery cell C1 increases from 6 to 9, the ratio of the cross-sectional area of the type-1 battery cell C1 to the cross-sectional area of the type-2 battery cell C2 increases, and the amount of heat generated by the type-1 battery cell C1 markedly increases from about 1.6 times to about 4.2 times the amount of heat generated by the type-2 battery cell C2.

For example, as the number of type-2 battery cells C2 arranged around the type-1 battery cell C1 increases, the first diameter D1 of the type-1 battery cell C1 increases relative to the second diameter D2 of the type-2 battery cell C2, and thus the cross-sectional area of the type-1 battery cell C1 may relatively increase. Thus, since the cross-sectional area of the type-1 battery cell C1 generating a relatively large amount of heat increases relative to the cross-sectional area of the type-2 battery cell C2, the heat generation ratio of the type-1 battery cell C1 to the type-2 battery cell C2 increases. In this case, the increase in the heat generation ratio of the type-1 battery cell C1 means an increase in the difference between the amount of heat generated by the type-1 battery cell C1 and the amount of heat generated by the type-2 battery cell C2, which may result in an increase in the temperature difference between the type-1 battery cell C1 and the type-2 battery cell C2 and may facilitate heat diffusion (or dissipation) from the type-1 battery cell C1 to the type-2 battery cell C2. In other words, as the number of type-2 battery cells C2 arranged around the type-1 battery cell C1 increases, the amount of heat generated by the type-1 battery cell C1 (which has a characteristic of generating a relatively large amount of heat) may increase. In this case, however, since the type-2 battery cells C2 (which have a characteristic of generating a relatively small amount of heat) are arranged around the type-1 battery cell C1 (which has a characteristic of generating a relatively large amount of heat), heat diffusion from the type-1 battery cell C1 to the type-2 battery cells C2 may be facilitated. In various embodiments, the number of arrangements of the type-2 battery cells C2 may be designed to be at least 7. As shown in FIG. 8, when the number of type-2 battery cells C2 is 6, the amount of heat that the type-1 battery cell C1 generates is about 1.6 times the amount of heat that the type-2 battery cell C2 generates, and thus the heat generation ratio of the type-1 battery cell C1 to the type-2 battery cell C2 (or the temperature difference between the type-1 battery cell C1 and the type-2 battery cell C2) is not sufficiently large to facilitate heat diffusion from the type-1 battery cell C1 to the type-2 battery cell C2. Thus, in various embodiments, the number of type-2 battery cells C2 may be at least 7.

Figure 9:
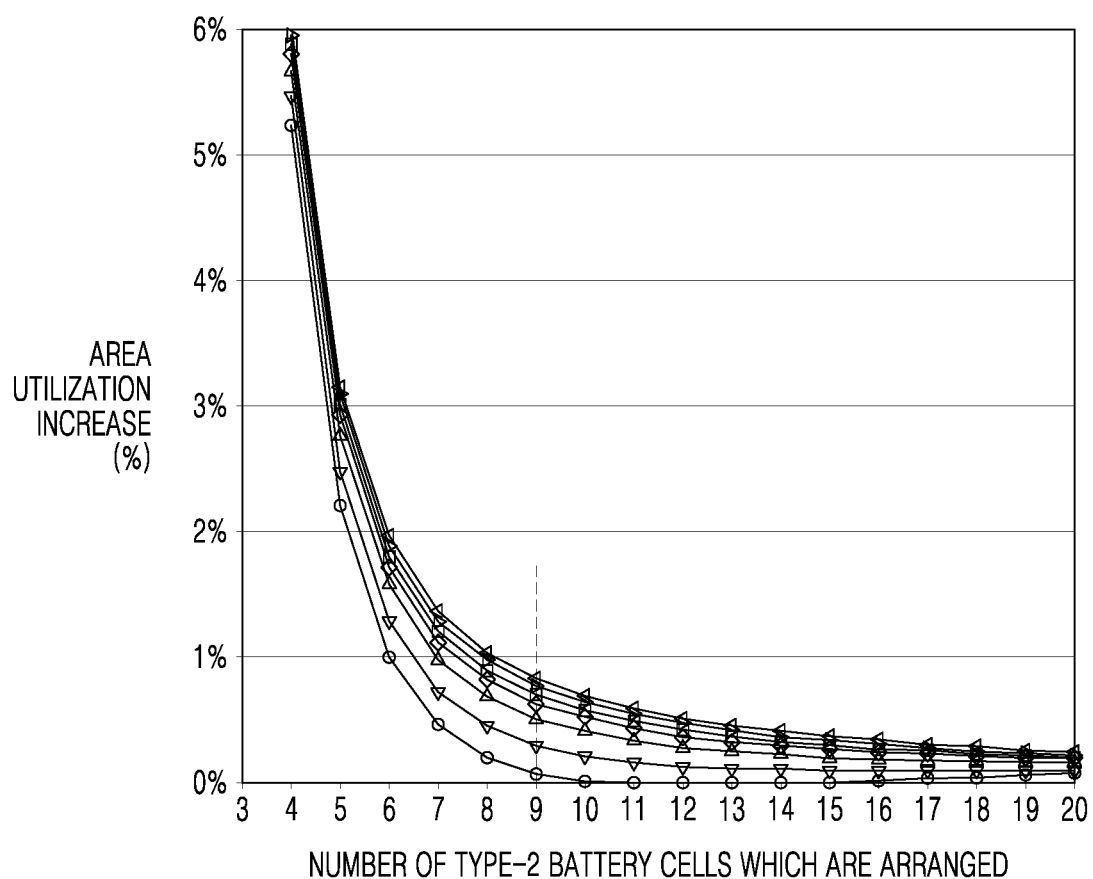
FIG. 9 is a graph illustrating variations in area utilization increase (%) according to the number of type-2 battery cells arranged around the type-1 battery cell.

FIG. 9 is a graph illustrating variations in "area utilization increase" (expressed as a percentage (%)) according to the number of type-2 battery cells C2 arranged around the type-1 battery cell C1. Here, the term "area utilization" may refer to the ratio of the total cross-sectional area of the type-1 battery cell C1 and the type-2 battery cells C2 to the area of a cell region S (refer to FIGS. 1 and 2) in which the type-1 battery cell C1 and the type-2 battery cells C2 are included (or bounded). In addition, the term "area utilization increase" may refer to an increase (%) in the ratio of the total cross-sectional area of the type-1 battery cell C1 and the type-2 battery cells C2 to the area of a cell region S (refer to FIGS. 1 and 2) in which the type-1 battery cell C1 and the type-2 battery cells C2 are included.

In an embodiment, the energy density per unit volume related to the capacity of the battery pack P may be improved by removing a dead space TS (refer to FIGS. 1 and 2) that do not contribute to energy output or conversion. For example, the type-2 battery cells C2 may be arranged along the circumference of the type-1 battery cell C1, and in this case, a dead space TS may be formed, between type-2 battery cells C2 adjacent to an arc of the type-1 battery cell C1, in a columnar shape in the lengthwise direction of the type-1 battery cell C1. For example, the dead space TS may include: gaps (g) between the type-1 battery cell C1 and the type-2 battery cells C2 adjacent to each other; three portions concavely converging along the gaps (g) between the type-1 battery cell C1 and the type-2 battery cells C2 adjacent to each other (e.g., arcuate portions of the outer circumferences of the type-1 battery cell C1 and the type-2 battery cells C2 adjacent to each other); and a columnar space extending in the lengthwise direction of the type-1 battery cell C1.

In an embodiment, the dead space TS may be reduced by increasing the number of type-2 battery cells C2 arranged around the type-1 battery cell C1. For example, a dead space TS between type-2 battery cells C2 adjacent to each other in contact with arcs of the type-1 battery cell C1 may be reduced by increasing the size (first diameter D1) of the type-1 battery cell C1 relative to the size (second diameter D2) of each of the type-2 battery cells C2 to increase the number of type-2 battery cells C2 arranged around the type-1 battery cell C1.

Referring to FIG. 9, as the number of type-2 battery cells C2 arranged around the type-1 battery cell C1 increases, the area utilization increases, and the dead space TS decreases. For example, the area utilization may refer to the ratio of the total cross-sectional area of the type-1 battery cell C1 and the type-2 battery cells C2 to the area of the cell region S in which the type-1 battery cell C1 and the type-2 battery cells C2 are included, and as the total cross-sectional area of the type-1 battery cell C1 and the type-2 battery cells C2 increases relative to the area of the cell region S, that is, as the cross-sectional area of the dead space TS, which corresponds to an area of the cell region S except for the total cross-sectional area of the type-1 battery cell C1 and the type-2 battery cells C2, decreases relative to the area of the cell region S, the area utilization may increase. The cell region S will be described later.

Referring to FIG. 9, the increase in the area utilization is relatively large when the number of type-2 battery cells C2 is relatively small, and is relatively small when the number of type-2 battery cells C2 is relatively large. For example, when the number of type-2 battery cells C2 is 9 or more, the area utilization increase converges to a nearly constant value, and thus increasing the number of type-2 battery cells C2 to 9 or more has substantially no effect on the increase in area utilization or the decrease in the dead space TS. Thus, in an embodiment, the number of type-2 battery cells C2 arranged around the type-1 battery cell C1 may be set to be 8 or less.

Referring to FIGS. 1 and 2, in an embodiment, the battery cells of the battery pack P, that is, the type-1 battery cell C1 and the type-2 battery cells C2 of the battery pack P, may be arranged in the cell region S defined by an envelope that continuously surrounds the type-2 battery cells C2 arranged around the type-1 battery cell C1. For example, in an embodiment, the envelope defining the cell region S may be a curve (e.g., a circle) which continuously surrounds the type-2 battery cells C2 arranged around the type-1 battery cell C1 while being continuously in contact with the outer circumferential surfaces of the type-2 battery cells C2 arranged along the type-1 battery cell C1. In an embodiment, the type-1 battery cell C1 may be a circular battery cell having a cross-section with the first diameter D1, and the type-2 battery cells C2 may be circular battery cells each having a cross-section with the second diameter D2. In this case, the cell region S may have a circular shape defined by an arc-shaped envelope.

In an embodiment, the type-1 battery cell C1 may be arranged at a central position of the cell region S, and the type-2 battery cells C2 may be arranged along an edge of the cell region S. That is, in an embodiment, the center of the type-1 battery cell C1 may be aligned with the center position or center point of the cell region S, and the centers of the type-2 battery cells C2 may be arranged along arcs surrounding the central position of the cell region S. Additionally, in the illustrated embodiment, outer circumferential portions or arcs of the type-2 battery cells C2 are arranged along the cell region S.

In an embodiment, the battery pack P may further include a pack case PC (shown in FIGS. 1 and 2) which contains the type-1 battery cell C1 and the type-2 battery cells C2. The pack case (PC) may include a cylindrical cell accommodation space CA having a circular cross-section and extending in the lengthwise direction of the type-1 battery cell C1 and the type-2 battery cells C2.

Figure 10A:
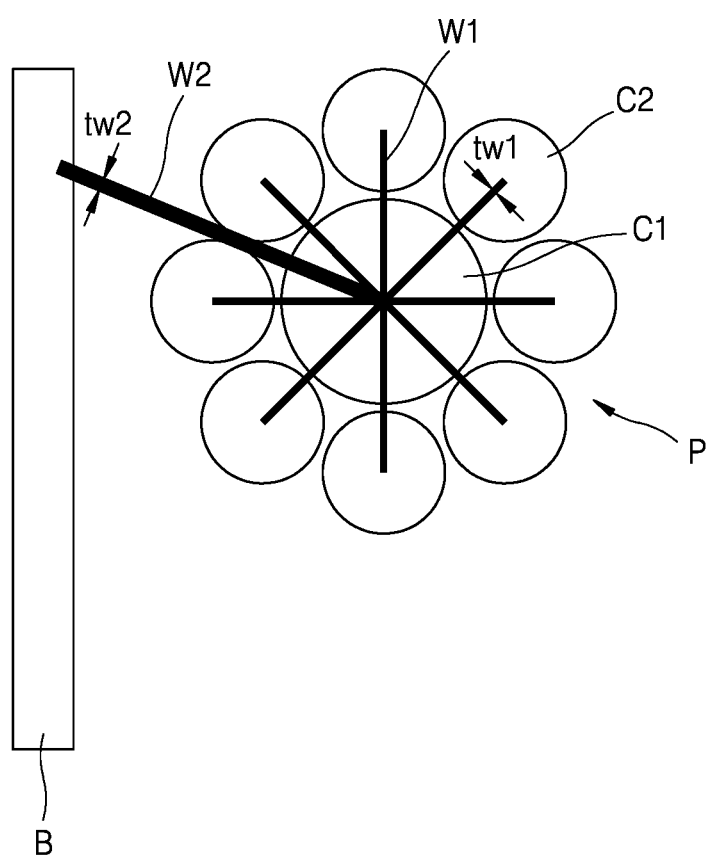
FIGS. 10A to 10C are views illustrating electrical connection structures of the type-1 battery cell and the type-2 battery cells according to various embodiment.
Figure 10B:
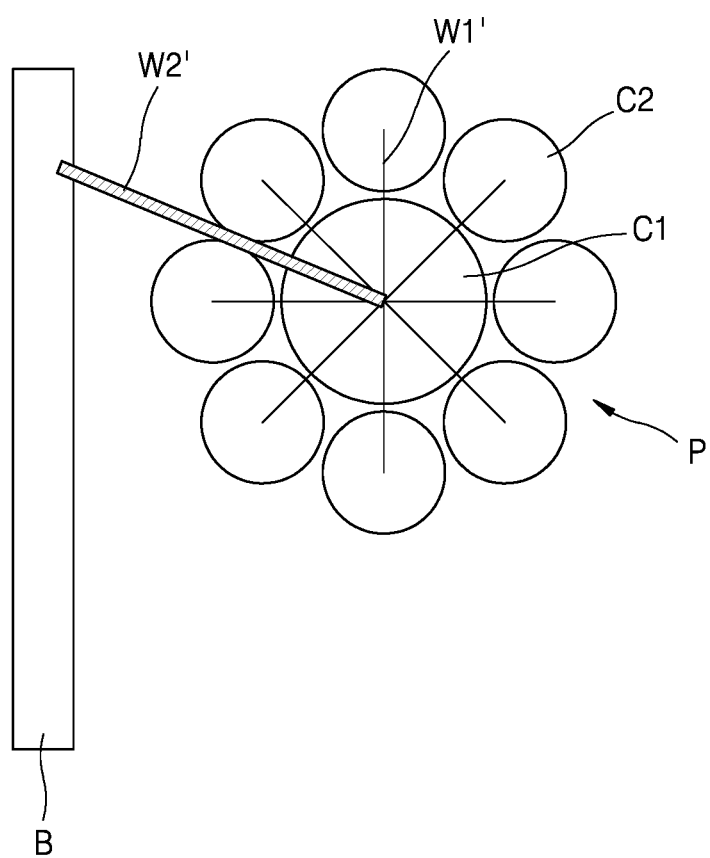
Figure 10C:
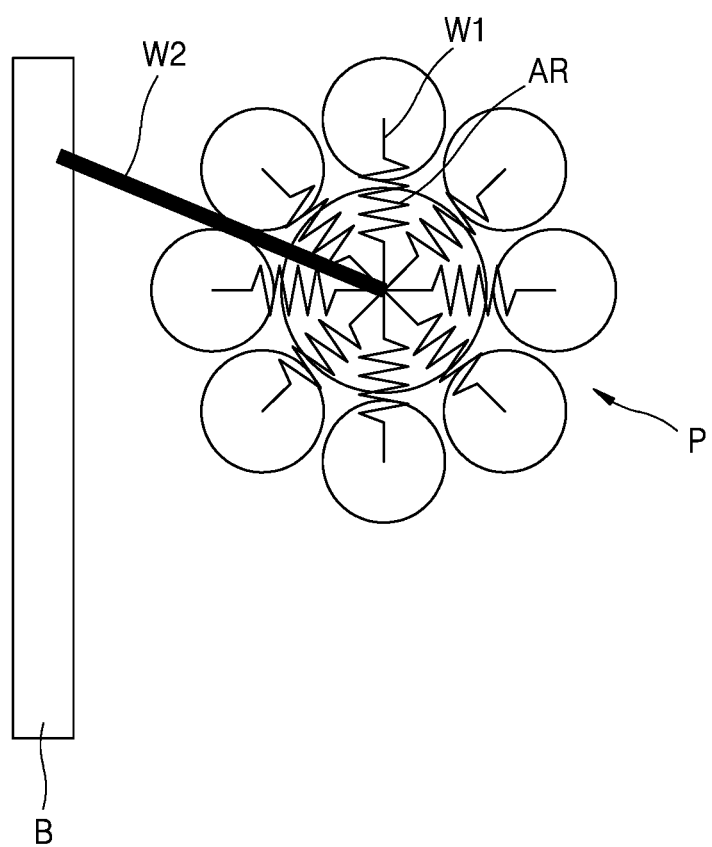

FIGS. 10A to 10C are views illustrating electrical connection structures of the type-1 battery cell C1 and the type-2 battery cells C2 according to various embodiments of the present disclosure.

Referring to FIG. 10A, the type-1 battery cell C1 and the type-2 battery cells C2 arranged around the type-1 battery cell C1 may be connected in parallel to each other. The type-1 battery cell C1 and the type-2 battery cells C2 may be connected in parallel to each other through a plurality of connection wires W1. The connection wires W1 may include as many connection wires W1 as the number of type-2 battery cells C2 arranged around the type-1 battery cell C1 (i.e., the number of connection wires W1 may be equal to the number of type-2 battery cells C2 arranged around the type-1 battery cell C1). In this case, each of the connection wires W1 may electrically connect the type-1 battery cell C1 to one of the type-2 battery cells C2. For example, each of the connection wires W1 may extend radially outward from an electrode of the type-1 battery cell C1 and may be respectively connected to an electrode of a corresponding one of the type-2 battery cells C2. The connection wires W1 may connect the type-1 battery cell C1 and the plurality of type-2 battery cells C2 in parallel to each other while forming a common contact on the electrode of the type-1 battery cell C1. The connection wires W1 may electrically connect the type-1 battery cell C1 and the type-2 battery cells C2 to each other to supplement the capacities of the type-1 battery cell C1 and the type-2 battery cells C2 for each other. For example, the type-1 battery cell C1 is configured to rapidly output high power in response to a peak load, and the type-2 battery cell C2 may supplement the capacity of the type-1 battery cell C1 through the connection wires W1.

The type-1 battery cell C1 and the type-2 battery cell C2 may cooperate with each other to cope with power requested from an external load, and may generate currents allocated according to a resistance connected to the type-1 battery cell C1 and the type-2 battery cells C2. Here, "resistance" connected to the type-1 battery cell C1 and the type-2 battery cell C2 may be a collective term encompassing the internal resistance of the type-1 battery cell C1, the internal resistance of the type-2 battery cell C2, and external resistance connected to the type-1 battery cell C1 and the type-2 battery cell C2. The type-1 battery cell C1 and the type-2 battery cell C2, which respectively have a relatively high output power density and a relatively high energy density, may have different internal resistances, and the internal resistance of the type-2 battery cell C2 may be greater than the internal resistance of the type-1 battery cell C1. In addition, according to the design of the internal resistances, the type-1 battery cell C1 may generate more current than the type-2 battery cell C2. For example, the internal resistances may include a reactance component, and the type-1 battery cell C1 may generate most of current in a peak load condition, whereas the type-1 battery cell C1 and the type-2 battery cell C2 may cooperatively generate current in a basic load condition. In an embodiment, the battery pack P may supply driving power for an electric vehicle. In this case, the type-1 battery cell C1 may generate most of current in response to a peak load when the vehicle is accelerated, and the type-1 battery cell C1 and the type-2 battery cell C2 may cooperatively generate current in response to a basic load when the vehicle is driven at a constant speed or a substantially constant speed.

In an embodiment, when the vehicle is decelerated, the battery pack P may be charged with regenerative current. In this case, the type-1 battery cell C1 may be charged with most of the instantaneous regenerative current, and the capacity of the type-2 battery cell C2 may be supplemented through the connection wires W1 connected between the type-1 battery cell C1 and the type-2 battery cells C2. When the type-2 battery cell C2 instantaneously (or substantially instantly) generates high current or is charged with instantaneous (or substantially instantaneous) current, the lifespan of the type-2 battery cell C2 may be shortened, and thus the type-1 battery cell C1 may instantaneously (or substantially instantaneously) generate high current or may be charged with instantaneous (or substantially instantaneous) high current while maintaining the balance between the capacity of the type-1 battery cell C1 and the capacity of the type-2 battery cell C2 through the connection wire W1.

An input/output wire W2 may be connected between the type-1 battery cell C1 and an external load to form a charge-discharge path. The input/output wire W2 may form a common charge-discharge path between the type-1 battery cell C1 and an external load, and between the type-2 battery cell C2 and the external load. For example, the input/output wire W2 connected to an electrode of the type-1 battery cell C1 may be connected toward the external load, and the charge-discharge path of the type-1 battery cell C1 may include the input/output wire W2. In addition, the input/output wire W2 may form a common contact with the connection wires W1 on the electrode of the type-1 battery cell C1, and the charge-discharge path of the type-2 battery cells C2 may include: the connection wires W1 connected between the electrodes of the type-2 battery cell C2 and the electrode of the type-1 battery cell C1; and the input/output wire W2 connected from the electrode of the type-1 battery cell C1 toward the external load.

The charge and discharge paths of the type-1 battery cell C1 and the type-2 battery cells C2 may include the input/output wire W2 forming a common charge-discharge path for the type-1 battery cell C1 and the type-2 battery cells C2, and the charge-discharge path of the type-2 battery cells C2 may include the connection wires W1 in addition to the input/output wire W2. In other words, the charge-discharge path of the type-2 battery cells C2 may be longer than the charge-discharge path of the type-1 battery cell C1. Due to the different wiring structures of the type-1 battery cell C1 and the type-2 battery cells C2, the external resistance between the type-2 battery cells C2 and the external load may be greater than the external resistance between the type-1 battery cell C1 and the external load.

Furthermore, in response to power request from the external load, the type-1 battery cell C1 and the type-2 battery cells C2 may generate currents allocated according to the resistance ratio of the type-1 battery cell C1 and the type-2 battery cells C2, and the type-1 battery cell C1 may generate more current than the type-2 battery cells C2 according to the design of external resistance as described above. As described above, the internal resistance of the type-1 battery cell C1 (which has a relatively high output power) is less than the internal resistance of each of the type-2 battery cells C2 (which have a relatively high capacity), and the external resistance connected to the type-1 battery cell C1 is less than the external resistance connected to the type-2 battery cells C2. Thus, the type-1 battery cell C1 may generate more current than the type-2 battery cell C2 according to the ratio of internal and external resistance of the type-1 battery cell C1 to the internal and external resistance of the type-2 battery cell C2.

In an embodiment, since resistance (external resistance) connected to the type-1 battery cell C1 and resistance (external resistance) connected to the type-2 battery cell C2 are designed to be different from each other, the type-1 battery cell C1 may be responsible for more current than the type-2 battery cells C2, and the type-1 battery cell C1 may generate most of current required in an instantaneous peak load condition. Thus, the lifespan of the type-2 battery cells C2 may not be shortened, and the battery pack P may be capable of instantaneously outputting high power without a decrease in lifespan for a long time.

The difference between the resistance (external resistance) connected to the type-1 battery cell C1 and the resistance (external resistance) connected to the type-2 battery cells C2 may be implemented by differently designing the resistance of the input/output wire W2 connected to the type-1 battery cell C1 and the resistance of the connection wires W1 connected to the type-2 battery cells C2.

Referring to FIG. 10A, the cross-sectional area (for example, thickness tw2) of the input/output wire W2 may be greater than the cross-sectional area (for example, thickness tw1) of each of the connection wires W1, and thus the resistance of each of the connection wires W1 may be greater than the resistance of the input/output wire W2. As described above, since the charge-discharge path of the type-2 battery cells C2 is longer than the charge-discharge path of the type-1 battery cell C1, the type-1 battery cell C1 may output more current. In addition to this, the responsibility for outputting current may be further imposed on the type-1 battery cell C1 by differently designing the cross-sectional areas of the input/output wire W2 and the connection wires W1.

Referring to FIG. 10B, different materials may be applied to an input/output wire W2' and connection wires W1'. For example, a first metal material may be applied to the input/output wire W2', and a second metal material may be applied to the connection wires W1'. In this case, the first and second metal materials may include different materials having different electrical conductivities and/or resistance values. For example, all the input/output wire W2' and the connection wires W1' may include metal materials having high electrical conductivity, and in this case, the first metal material of the input/output wire W2 ' may include a material having a higher electrical conductivity than the second metal material of the connection wires W1'. For example, in an embodiment, the input/output wire W2' may include copper having a relatively high electrical conductivity, and the connection wires W1' may include aluminum or nickel having a relatively low electrical conductivity. For example, the input/output wire W2' may include copper or a copper alloy, and the connection wires W1' may include aluminum, an aluminum alloy, nickel, or a nickel alloy.

Referring to FIG. 10C, each of the connection wires W1 may include an additional resistor AR, and thus the resistance of each of the connection wires W1 may be greater than the resistance of the input/output wire W2 due to the additional resistor AR. In one or more embodiments, the additional resistor AR may be elements resisting the flow of current in addition to the intrinsic resistance of wires, and for example, the additional resistor AR may be provided by adding a resistor to each of the connection wires W1 or bending portions of each of the connection wires W1.

In an embodiment, the input/output wire W2 and the connection wires W1 may have any structure or material enabling electrical connection in addition to having different resistances as described above, and for example, the input/output wire W2 and the connection wires W1 may be formed of a rigid material such as a metal bar or a flexible material such as a metal wire. For example, the input/output wire W2 and the connection wires W1 may be coupled to the electrode of the type-1 battery cell C1 and the electrodes of the type-2 battery cells C2 by welding, soldering, wire bonding, or the like.

In an embodiment, the battery pack P including the type-1 battery cell C1 and the type-2 battery cells C2 may be connected to an external load through a bus bar B, as shown in FIGS. 10A-10C. In this case, the input/output wire W2 for forming a common charge-discharge path for the type-1 battery cell C1 and the type-2 battery cells C2 may be connected between the electrode of the type-1 battery cell C1 and the bus bar B.

In an embodiment, the battery pack P may supply driving power to an electric vehicle, and in this case, the battery pack P may form a module together with other battery packs P electrically connected to the battery pack P to provide a high-power, high-capacity driving power source for the electric vehicle. In this case, the battery packs P may be electrically connected to each other through bus bars B. That is, the bus bar B is for collecting charge/discharge current from the battery packs P and may lower resistance or higher electrical conductivity than input/output wire W2 extending from the battery packs P. For example, the cross-sectional area of the bus bar B may be greater than the cross-sectional area of the input/output wire W2, and the bus bar B may include a third metal material having higher electrical conductivity than the first metal material of the input/output wire W2.

Figure 11:
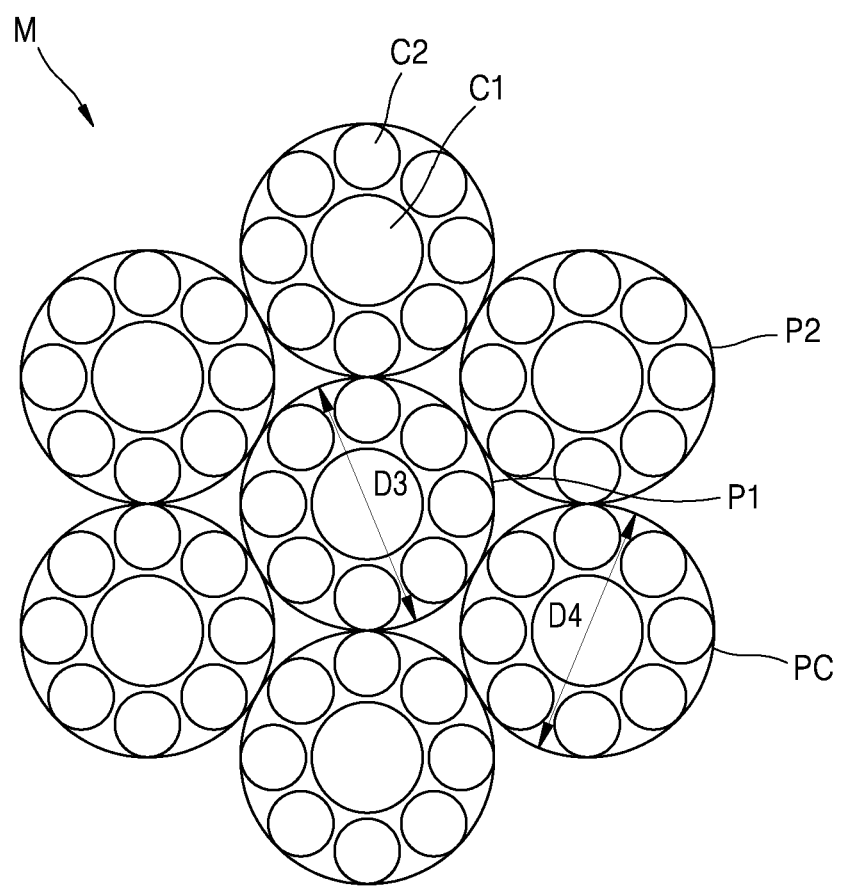
FIG. 11 is a view illustrating a battery module according to another aspect of the present disclosure.

FIG. 11 is a view illustrating a battery module M according to another embodiment of the present disclosure.

Referring to FIG. 11, the battery module M of the embodiment may include a plurality of battery packs. For example, the battery module M may include a first battery pack P1 and a plurality of second battery packs P2 surrounding the first battery pack P1 along the circumference of the first battery pack P1. In addition, each of the first and second battery packs P1 and P2 may include: a type-1 battery cell C1; and a plurality of type-2 battery cells C2, each having an output power and a capacity different from the output power and capacity of the type-1 battery cell C1, wherein the type-2 battery cells C2 are arranged along the circumference of the type-1 battery cell C1 to surround the type-1 battery cell C1 and are connected in parallel to the type-1 battery cell C1.

In an embodiment, the battery module M may include the first battery pack P1 and the second battery packs P2 arranged along the circumference of the first battery pack P1 to surround the first battery pack P1. In this case, the first battery pack P1 and the second battery packs P2 may have the same structure, and for example, each of the first battery pack P1 and the second battery packs P2 may include the type-1 battery cell C1 and the type-2 battery cells C2 surrounding the type-1 battery cell C1. In addition, the first battery pack P1 and the second battery packs P2 may each have a circular cross-sectional shape surrounding the type-1 battery cell C1 and the type-2 battery cells C2, and the first battery pack P1 and the second battery pack P2 may respectively have a third diameter D3 and a fourth diameter D4. In an embodiment, the first battery pack P1 and the second battery packs P2 may have the same structure and the same size. For example, the third diameter D3 of the first battery pack P1 may be equal to the fourth diameter D4 of each of the second battery packs P2. As described above, the first battery pack P1 and the second battery packs P2 may have the same structure, the same shape, and the same size, but may be differently arranged such that the second battery packs P2 may surround the first battery pack P1 along the circumference of the first battery pack P1. For example, when the first battery pack P1 is arranged at a center position, the second battery packs P2 may be arranged at peripheral positions surrounding the first battery pack P1. The first battery pack P1 and the second battery packs P2 have substantially the same structure as the structure of the battery pack P described with reference to FIGS. 1 and 2, and thus a description of the structure will not be repeated here.

Referring to FIG. 11, the second battery packs P2 may be arranged along the circumference of the first battery pack P1, and in an embodiment, the number of second battery packs P2 arranged along the circumference of the first battery pack P1 may be 6. In this case, the third diameter D3 of the first battery pack P1 and the fourth diameter D4 of each of the second battery packs P2 may have the same value. In an embodiment, the second battery packs P2 may be densely arranged along the circumference of the first battery pack P1 such that the outer circumferential surfaces of the second battery packs P2 adjacent to each other in the circumferential direction of the first battery pack P1 may be in contact with each other. For example, in the arrangement structure of the type-1 battery cell C1 and the type-2 battery cells C2 provided in each of the first and second battery packs P1 and P2, the number of type-2 battery cells C2 arranged along the circumference of the type-1 battery cells C1 may be 7 or more, and thus gaps (g) may be formed between the type-2 battery cells C2 adjacent to each other in the circumferential direction of the type-1 battery cell C1 so as to prevent heat propagation and a short circuit between the type-2 battery cells adjacent to each other with the gaps (g) therebetween (refer to FIGS. 6B to 6D). Unlike the arrangement structure of the type-1 battery cell C1 and the type-2 battery cells C2, in the arrangement structure of the first battery pack P1 and the second battery packs P2, no gaps (g) may be formed between the second battery packs P2 adjacent to each other in the circumferential direction of the first battery pack P1 in a state in which the outer circumferential surfaces of the second battery packs P2 adjacent to each other are in contact with each other. In addition, there may be no gaps (g) between the first battery pack P1 and the second battery packs P2 arranged along the circumference of the first battery pack P1, such that the outer circumferential surfaces of the first battery pack P1 and the second battery packs P2 may be in contact with each other. Accordingly, in the illustrated embodiment, gaps (g) are defined between adjacent type-2 battery cells C2 and between the type-1 battery cell C1 and each of the type-2 battery cells C2 in each of the first battery packs P1 and the second battery packs P2, but gaps are not defined between adjacent second battery packs P2 or between the first battery pack P1 and the second battery packs P2.

Each of the first battery pack P1 and the second battery packs P2 adjacent to each other in the circumferential direction of the first battery pack P1 is surrounded by a pack case PC capable of preventing or at least mitigating against heat propagation and a short circuit to some degree, and thus gaps (g) may not be formed between the first and second battery packs P1 and P2 and between the second battery packs P2 in a state in which the outer peripheral surfaces of the first and second battery packs P1 and P2 are in contact with each other, and the outer peripheral surfaces of the second battery packs P2 are in contact with each other. That is, the second battery packs P2 are densely arranged along the circumference of the first battery pack P1 in contact with each other, and thus the output power and capacity of the battery module M may be improved. In addition, although not shown in FIG. 11, the first battery pack P1 and the second battery packs P2, which are different from each other, may be electrically connected in parallel or series to each other through bus bars B.

Figure 12:
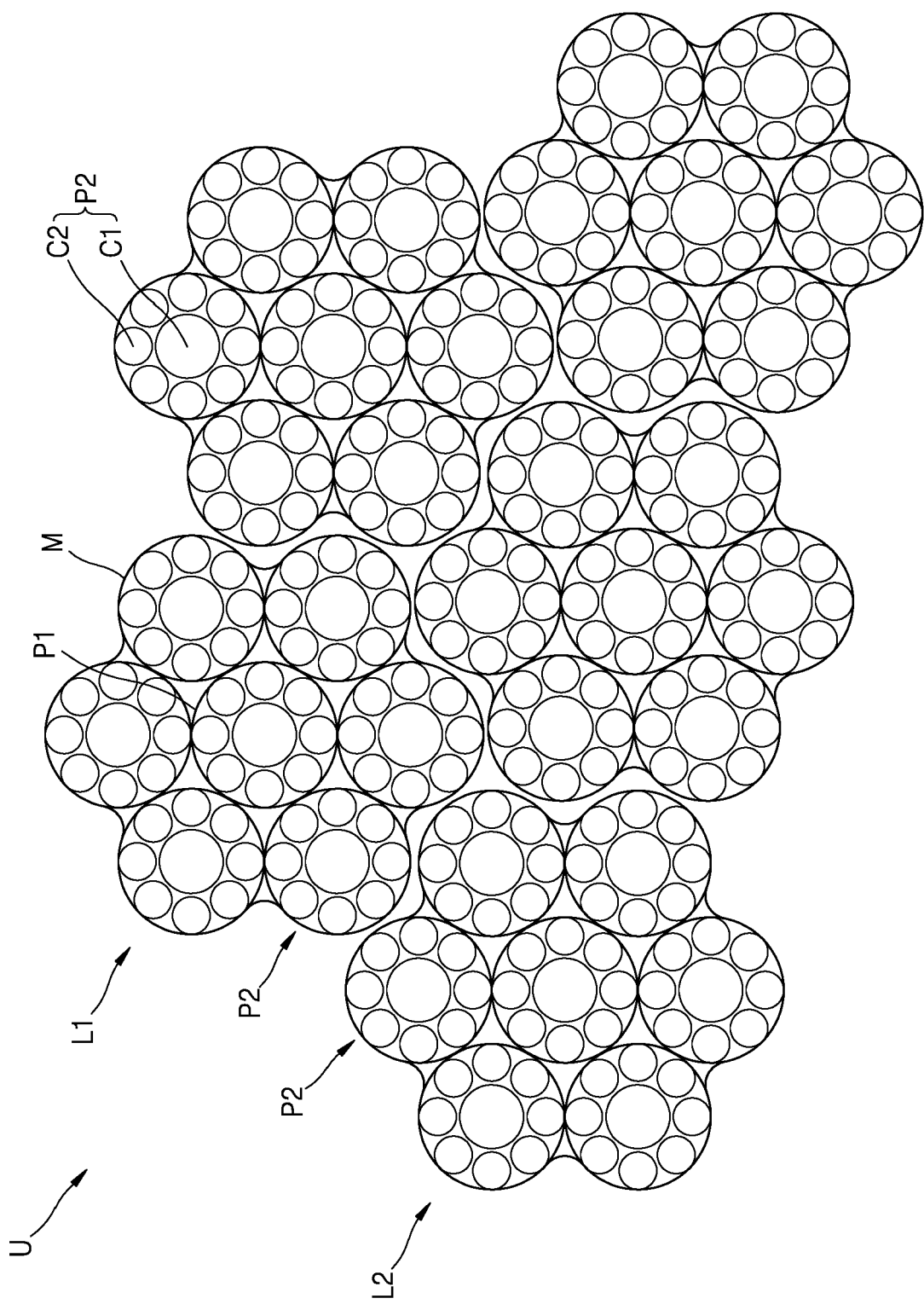
FIG. 12 is a view illustrating a power supply device according to another aspect of the present disclosure.

FIG. 12 is a view illustrating a power supply device according to another embodiment of the present disclosure.

Referring to FIG. 12, the power supply device of the embodiment may include a plurality of battery modules M such as the battery module M shown in FIG. 11, and since the power supply device includes the plurality of battery modules M, the power supply device may be used as a high-power, high-capacity power source to supply driving power to, for example, an electric vehicle.

Referring to FIG. 12, the battery modules M, which each include a first battery pack P1 and a plurality of second battery packs P2 arranged along the circumference of the first battery pack P1, may be staggered with respect to each other for a dense arrangement. For example, when the battery modules M are arranged in first and second rows L1 and L2, the battery modules M in the first row and the battery modules M in the second row may be densely arranged by being inserted between each other so as to provide a spatially efficient compact structure. In an embodiment, the battery modules M of the first row L1 and the battery modules M of the second row L2 may be densely arranged with respect to each other in such a manner that the second battery packs P2 forming the peripheries of the battery modules M of the first row L1 are engaged with the second battery packs P2 forming the peripheries of the battery modules M of the second row L2 along the boundary between the battery modules M of the first row L1 and the battery modules M of the second row L2.

As described above, according to the one or more of the above embodiments, the type-1 battery cell C1 may quickly output high power, and the type-2 battery cell C2 may improve the capacity of the battery pack P.

According to an embodiment, the type-1 battery cell C1 and the type-2 battery cell C2 may cooperate with each other to cope with power requested from an external load and may output currents allocated according to the ratio of resistance connected to the type-1 battery cell C1 and resistance connected to the type-2 battery cell C2. Since the resistance connected to the type-1 battery cell C1 and the resistance connected to the type-2 battery cell C2 are set to be different from each other, the type-1 battery cell C1 may output most of the current instantaneously required at a peak load, and thus the lifespan of the type-2 battery cell C2 may not be shortened. Therefore, the battery pack P may be provided as a high-power, high-capacity battery pack P capable of instantaneously outputting high power without a decrease in long-term lifespan.

In another embodiment, the battery pack P may be inexpensive and may have high-power and high-capacity characteristics due to the hybrid structure in which the type-1 battery cell C1 (having high output power) and the type-2 battery cell C2 (having high capacity), which are manufactured with different costs to have different output power characteristics, are used together.

In an embodiment, the type-2 battery cells C2 (which have a high capacity and generate a relatively small amount of heat) are arranged along the circumference of the type-1 battery cell C1 (which has a high output power and generates a relatively large amount heat), and thus a large amount of heat generated by the type-1 battery cell C1 may not be locally accumulated but may easily diffuse or dissipate through the type-2 battery cells C2 surrounding the type-1 battery cell C1.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A battery pack comprising:
a type-1 battery cell;
a plurality of type-2 battery cells arranged along a circumference of the type-1 battery cell to surround the type-1 battery cell, the plurality of type-2 battery cells being connected in parallel to the type-1 battery cell, each type-2 battery cell of the plurality of type-2 battery cells having an output power and a capacity different from an output power and a capacity of the type-1 battery cell,
wherein the type-1 battery cell has a circular cross-section with a first diameter,
wherein each type-2 battery cell of the plurality of type-2 battery cells has a circular cross-section with a second diameter,
wherein the first diameter of the type-1 battery cell is larger than the second diameter of each type-2 battery cell of the plurality of type-2 battery cells,
wherein a gap between the type-1 battery cell and the plurality of type-2 battery cells surrounding the type-1 battery cell extends continuously around an outer circumferential surface of the type-1 battery cell,
wherein the plurality of type-2 battery cells extend in a circle around a centerpoint of the type-1 battery cell,
wherein each type-2 battery cell of the plurality of type-2 battery cells is adjacent to another type-2 battery cell of the plurality of type-2 battery cells,
wherein a plurality of connection wires extend radially outward from a common contact on an electrode at the centerpoint of the type-1 battery cell and are respectively connected to electrodes of the plurality of type-2 battery cells; and
wherein an input/output wire forms a connection between the electrode at the centerpoint of the type-1 battery cell and an external load through a bus bar.

2. The battery pack of claim 1, wherein:
the output power of the type-1 battery cell is greater than the output power of each type-2 battery cell of the plurality of type-2 battery cells, and
the capacity of the type-1 battery cell is less than the capacity of each type-2 battery cell of the plurality of type-2 battery cells.

3. The battery pack of claim 1, wherein:
an output power density of the type-1 battery cell is greater than an output power density of each type-2 battery cell of the plurality of type-2 battery cells, and
an energy density of the type-1 battery cell is less than an energy density of each type-2 battery cell of the plurality of type-2 battery cells.

4. The battery pack of claim 1, wherein an internal resistance of the type-1 battery cell is less than internal resistance of each type-2 battery cell of the plurality of type-2 battery cells.

5. The battery pack of claim 1, wherein the type-1 battery cell exhibits a different voltage drop than each type-2 battery cell of the plurality of type-2 battery cells under a first discharge condition.

6. The battery pack of claim 1, wherein the type-1 battery cell has a different capacity than each type-2 battery cell of the plurality of type-2 battery cells under a second discharge condition.

7. The battery pack of claim 1, wherein:
the type-1 battery cell exhibits a different voltage drop than each type-2 battery cell of the plurality of type-2 battery cells under a first discharge condition,
the type-1 battery cell has a different capacity than each type-2 battery cell of the plurality of type-2 battery cells under a second discharge condition, and
the first discharge condition and the second discharge condition respectively correspond to a relatively high rate discharge condition and a relatively low rate discharge condition.

8. The battery pack of claim 1, wherein:
the type-1 battery cell comprises a first electrode assembly which comprises first and second electrode plates facing each other and a first separator arranged between the first and second electrode plates, and
each type-2 battery cell of the plurality of type-2 battery cells comprises a second electrode assembly which comprises third and fourth electrode plates facing each other and a second separator arranged between the third and fourth electrode plates.

9. The battery pack of claim 8, wherein:
the first electrode plate comprises a first positive electrode active material layer on a first positive electrode base material,
the second electrode plate comprises a first negative electrode active material layer on a first negative electrode base material,
the third electrode plate comprises a second positive electrode active material layer on a second positive electrode base material, and
the fourth electrode plate comprises a second negative electrode active material layer on a second negative electrode base material.

10. The battery pack of claim 9, wherein:
a thickness of the first positive electrode active material layer is less than a thickness of the second positive electrode active material layer, and
a thickness of the first negative electrode active material layer is less than a thickness of the second negative electrode active material layer.

11. The battery pack of claim 9, wherein:
a length of the first positive electrode active material layer is greater than a length of the second positive electrode active material layer, and
a length of the first negative electrode active material layer is greater than a length of the second negative electrode active material layer.

12. The battery pack of claim 11, wherein:
the length of the first positive electrode active material layer and the length of the first negative electrode active material layer correspond to lengths in a winding direction of the first electrode assembly, and
the length of the second positive electrode active material layer and the length of the second negative electrode active material layer correspond to lengths in a winding direction of the second electrode assembly.

13. The battery pack of claim 1, wherein a number of the plurality of type-2 battery cells arranged along the circumference of the type-1 battery cell is within a range of 6 to 9.

14. The battery pack of claim 13, wherein the number of the plurality of type-2 battery cells arranged along the circumference of the type-1 battery cells is within a range of 7 to 9.

15. The battery pack of claim 14, wherein the number of the plurality of type-2 battery cells arranged along the circumference of the type-1 battery cells is within a range of 7 to 8.

16. The battery pack of claim 1, wherein the plurality of type-2 battery cells adjacent to each other along the circumference of the type-1 battery cell are separate from each other.

17. The battery pack of claim 16, wherein gaps are defined between mutually-facing outer circumferential surfaces of the plurality of type-2 battery cells adjacent to each other along the circumference of the type-1 battery cell.

18. The battery pack of claim 1, wherein a clearance space is defined between the plurality of type-2 battery cells which are adjacent to each other along an outer circumferential surface of the type-1 battery cell, and wherein the clearance space comprises three portions concavely converging toward gaps between the type-1 battery cell and two type-2 battery cells which are adjacent to each other, the clearance space extending in a columnar shape in a length direction of the type-1 battery cell.

19. The battery pack of claim 1, wherein a number of the plurality of connection wires is equal to a number of the plurality of type-2 battery cells arranged along the circumference of the type-1 battery cell.

20. The battery pack of claim 19, wherein each connection wire of the plurality of connection wires forms an electrical connection between the type-1 battery cell and one type-2 battery cell of the plurality of type-2 battery cells.

21. The battery pack of claim 1, the input/output wire defining a charge-discharge path toward the external load.

22. The battery pack of claim 21, wherein the input/output wire forms a common charge-discharge path between the type-1 battery cell and the external load and between the plurality of type-2 battery cells and the external load.

23. The battery pack of claim 21, wherein:
a charge-discharge path of the type-1 battery cell comprises the input/output wire, and
a charge-discharge path of the plurality of type-2 battery cells comprises both the input/output wire and the plurality of connection wires.

24. The battery pack of claim 23, wherein the charge-discharge path of the plurality of type-2 battery cells is longer than the charge-discharge path of the type-1 battery cell.

25. The battery pack of claim 21, wherein a resistance of each of the plurality of connection wires is greater than a resistance of the input/output wire.

26. The battery pack of claim 25, wherein a cross-sectional area of the input/output wire is greater than a cross-sectional area of each of the plurality of connection wires.

27. The battery pack of claim 25, wherein
the input/output wire and the plurality of connection wires respectively comprise first and second metal materials which are different from each other, and
an electrical conductivity of the first metal material is greater than an electrode conductivity of the second metal material.

28. The battery pack of claim 25, wherein the plurality of connection wires comprises an additional resistor.

29. The battery pack of claim 1, wherein the type-1 battery cell and the plurality of type-2 battery cells are enclosed by a circular envelope continuously in contact with outer circumferential surfaces of the plurality of type-2 battery cells arranged along the circumference of the type-1 battery cell, and wherein the circular envelop continuously surrounds the plurality of type-2 battery cells.

30. A battery module comprising:
a first battery pack; and
a plurality of second battery packs arranged along a circumference of the first battery pack to surround the first battery pack,
wherein each of the first battery pack and the plurality of second battery packs comprises:
a type-1 battery cell;
a plurality of type-2 battery cells arranged along a circumference of the type-1 battery cell to surround the type-1 battery cell, the plurality of type-2 battery cells being connected in parallel to the type-1 battery cell, each type-2 battery cell of the plurality of type-2 battery cells having an output power and a capacity different from an output power and a capacity of the type-1 battery cell,
wherein the type-1 battery cell has a circular cross-section with a first diameter,
wherein each type-2 battery cell of the plurality of type-2 battery cells has a circular cross-section with a second diameter,
wherein the first diameter of the type-1 battery cell is larger than the second diameter of each type-2 battery cell of the plurality of type-2 battery cells,
wherein a gap between the type-1 battery cell and the plurality of type-2 battery cells surrounding the type-1 battery cell extends continuously around an outer circumferential surface of the type-1 battery cell,
wherein the plurality of type-2 battery cells extend in a circle around a centerpoint of the type-1 battery cell,
wherein each type-2 battery cell of the plurality of type-2 battery cells is adjacent to another type-2 battery cell of the plurality of type-2 battery cells, and
wherein a plurality of connection wires extend radially outward from forms-a common contact on an electrode at the centerpoint of the type-1 battery cell and are respectively connected to electrodes of the plurality of type-2 battery cells; and
wherein an input/output wire forms a connection between the electrode at the centerpoint of the type-1 battery cell and an external load through a bus bar.

31. The battery module of claim 30, wherein:
the first battery pack has a circular cross-section with a third diameter, and each second battery pack of the plurality of second battery packs has a circular cross-section with a fourth diameter.

32. The battery module of claim 31, wherein:
the third diameter and the fourth diameter are equal to each other, and
a number of the plurality of second battery packs arranged along the circumference of the first battery pack is 6.

33. A power supply device comprising a plurality of the battery module of claim 30,
wherein the plurality of battery modules are arranged in first and second rows, and
wherein first battery modules of the plurality of battery modules in the first row and second battery modules of the plurality of battery modules in the second row are staggered with respect to each other and inserted between each other.

* * * * *